United States Patent [19]
Moore et al.

[11] Patent Number: 5,835,759
[45] Date of Patent: *Nov. 10, 1998

[54] LAUNCHING COMPUTER APPLICATIONS

[75] Inventors: Mark Douglass Moore, Palo Alto, Calif.; David M. Burckhartt; Drew S. Johnson, both of Houston, Tex.; Norman P. Brown, Tomball, Tex.; Randall L. Hess, Cypress, Tex.

[73] Assignee: Compaq Computer Corporation, Houston, Tex.

[ * ] Notice: The term of this patent shall not extend beyond the expiration date of Pat. No. 5,732,266.

[21] Appl. No.: 877,214

[22] Filed: Jun. 17, 1997

Related U.S. Application Data

[63] Continuation of Ser. No. 300,164, Sep. 2, 1994, Pat. No. 5,732,266.

[51] Int. Cl.⁶ .................................................. G06F 9/06
[52] U.S. Cl. ............................................................. 395/651
[58] Field of Search ..................................... 395/651, 652, 395/653, 712, 200.5, 200.51, 200.52

[56] References Cited

U.S. PATENT DOCUMENTS

| | | |
|---|---|---|
| 5,274,819 | 12/1993 | Blomfield-Brown . |
| 5,291,585 | 3/1994 | Sato et al. . |
| 5,325,532 | 6/1994 | Crosswy et al. . |
| 5,379,431 | 1/1995 | Lemon et al. . |
| 5,392,386 | 2/1995 | Chalas . |
| 5,418,941 | 5/1995 | Peters . |
| 5,426,775 | 6/1995 | Boccon-Gibod . |

FOREIGN PATENT DOCUMENTS

| | | |
|---|---|---|
| A-0592079 | 4/1990 | European Pat. Off. . |
| A-0358304 | 3/1994 | European Pat. Off. . |
| A-1142857 | 6/1989 | Japan . |

OTHER PUBLICATIONS

*Summer Conf. Proc.*, USENIX Assoc., "When Network File Systems Aren't Enough: Automatic Software Distribution Revisited", Nachbor, D., Jun. 9, 1986, pp. 159–171. (cbe)

*IBM Technical Disclosure Bulletin*, vol. 32, No.9A, "Initialization Code Executed After Post and Before the Operating System Gets Control", Sep. 1990, pp. 407–408. (cbe)

*IBM Technical Disclosure Bulletin*, vol. 28, No. 4, "Configuration File Comprising Configuration Commands and Data", Sep. 1995, p. 1441. (cbe)

*IBM Technical Disclosure Bulletin*, vol. 37, No. 2B, "Changing System Configuration for Shared Windows Applications", Feb. 1994.

European Search Report dated Nov. 6, 1995.

*Primary Examiner*—Kevin A. Kriess
*Attorney, Agent, or Firm*—Pravel, Hewitt & Kimball

[57] ABSTRACT

A computer application stored on a storage medium (e.g., a portable storage medium such as a compact disk) is automatically launched. Initialization information expressed in accordance with a predefined syntax is stored on the storage medium. Also stored in the computer is "launching" information sufficient, together with the initialization information, to enable the computer to launch the application. The application is automatically launched, without user intervention, by reading the initialization information and using it in connection with the launching information stored in the computer.

15 Claims, 21 Drawing Sheets

SAMPLE INITIALIZATION FILE

81— DOS
　　　WINDOWED=NO
　　　XMS=2048K —82a
　　　MOUSE —82b
　　　DOSMEM=590K
84— [O]VESA
　　　[O]AUDIO DAC
　　　[O]AUDIO FM
　　　[O]AUDIO MIDI
　　　[O]DISK CACHE=512K —82c
　　　FIXED DISK
　　　FLOPPY DISK
　　　[O]MODEM
　　　EXECUTABLE=<CD DRIVE>\XYZ.EXE —86
88— IF NOT EXIST \XYZ THEN <CD DRIVE>\SETUP.EXE

SAMPLE TRANSLATION FILE

76 — [XMS]
80a — {C}DEVICE=HIMEM.SYS — 78
{C}DOS=HIGH

[EMS]
{C}DEVICE=C:\DOS\EMM386.EXE X=C000-C7FF
{C}DOS=UMB

[MOUSE]
80b — {A,41120}C:\MOUSE\MOUSE.COM
80c

[VESA]
{A,26508}C:\CPQDOS\CPQVESA.EXE

[CD]
{C}DEVICE=C:\DOS\ASPICD.SYS
{C}DEVICE=C:\DOS\ASPI2DOS.SYS
{A,27952}C:\DOS\MSCDEX.EXE

[DISK CACHE]
{A,45456}C:\WINDOWS\SMARTDRV.EXE 2048 128

[OPTIONS]

[AUDIO DAC]
[AUDIO FM]
{A}SET BLASTER=A220 I5 D1 T5

*FIG. 5B*

LAUNCHING COMPUTER APPLICATIONS

This is a continuation of allowed application Ser. No. 08/300,164, filed Sep. 2, 1994, now U.S. Pat. No. 5,732,266.

BACKGROUND

This invention relates to launching computer applications.

In recent years, the decreasing costs of consumer electronics has led to an explosion of personal computers (PCs) in the marketplace. Today, the PC is commonplace in small businesses and private homes. This fact, combined with the availability and variety of an almost limitless number of consumer-oriented application packages, has led to a rapidly increasing number of ordinary consumers who use the PC as both a productivity tool and a form of entertainment.

More recently, the decline in the cost of compact disk (CD) technology, coupled with the enormous storage capacity of the CD, has made the CD an attractive medium for the dissemination of information, including the distribution of computer applications. The CD is particularly well-suited to the storage of multi-media applications. Multi-media applications are particularly attractive to the ordinary consumer because their true-to-life audio and video capabilities make consumer-computer interaction easier and more natural than previously possible.

The steps in launching an application, i.e., installation, configuration, and execution, may be frustrating to the ordinary consumer, because they tend to be DOS-based, and because different developers of multi-media applications make inconsistent assumptions about the operating environment of the applications, thereby requiring the computer system to be configured or reconfigured with the specific requirements of the application in mind. For example, some applications require the use of an expanded memory manager while others will operate only if no expanded memory is allocated. Other applications require extended memory. Some applications require a VESA (video) driver, while other memory-starved applications will not operate on a system after a VESA driver is installed. To complicate matters, the user often must run both system-specific and application-specific set up programs to properly configure the computer system for the particular application.

SUMMARY

In general, in one aspect, the invention features automatic launching of a computer application stored on a storage medium (e.g., a portable storage medium such as a compact disk). Initialization information (e.g., a DOS file) is stored on the storage medium. The initialization information is expressed in accordance with a predefined syntax. Launching information is stored in the computer; the launching information is sufficient, together with the initialization information, to enable a computer to launch the application. The application is automatically launched without user intervention by reading the initialization information and using it in connection with the launching information stored in the computer.

Implementations of the invention may include the following features. The initialization information may identify categories of computer system resources (e.g., modems, memory managers, CD-ROM drivers, sound resources and video resources) used by the application. The launching information may include, for each available specific computer system resource, translation information associated with using that specific resource, and information, expressed in accordance with the predefined syntax, associating the specific resource with one of the categories of resources. The translation information is automatically used to identify specific resources which are associated with the categories of resources used by the application. The initialization information may include execution information identifying an executable file that starts the computer application, and the executable file may be invoked in connection with launching the application. The initialization information may include commands to be appended to, added to, or to replace existing commands in the config.sys, autoexec.bat, or system.ini files of the computer. Multiple applications may be handled by including in the initialization information, computer resource information with respect to each of the applications. The translation information may include commands for inclusion in autoexecution, system configuration, system initialization, and windows initialization files. There may also be an indication, for each command, of which kind of file it is to be inserted into.

Autoexecution, system configuration, system initialization, and windows initialization files on the computer may be automatically updated based on the initialization information. The files may be updated with respect to optionally required resources only when there is enough memory to use a particular resource. The launching of the application may include automatically running a launch program on the computer which searches for the initialization information, and translates the information, using the translation information, into the specific resource information stored on the computer. The computer may be automatically rebooted in connection with launching the application.

The initialization information may indicate whether a resource is required for the application or optional, and whether the computer application is intended to run under DOS and/or under Windows. The initialization information may enable automatic determination of whether an installation or setup program must be run with respect to the application, and information about how to run it.

In general, in another aspect, the invention features a method for automatically launching a computer application stored on a storage medium, in which each of the following steps is performed automatically: searching the storage medium for an initialization file identifying categories of computer system resources used by the application; using a translation file stored in the computer to identify available specific resources which are associated with categories of resources used by the application as indicated in the initialization file; updating autoexecution and system configuration files in accordance with information contained in the translation file. The invention may also perform the step of automatically determining if the application requires installation or setup, and if so executing the installation or setup.

In general, in another aspect, the invention features the storage medium itself on which is stored the application program and the initialization file.

In general, in another aspect, the invention features a method of enabling a specific system resource to be used with an application to be run on a computer. Information is created for storage on the computer, such that the information is expressed in accordance with a predefined syntax, defines how the specific resource is to be configured, and associates configuration information with an identifier of a category of resource to which the specific resource belongs. The information may be used, in cooperation with initialization information associated with the application to be run, to automatically configure the specific computer system resource for proper operation with the application.

In general, in another aspect, the invention features a method of aiding automatic launching of a computer application stored on a storage medium by automatically determining, in connection with launching the application, if an installation or setup program must be run for the application and, if so, executing the installation or setup program.

The invention attends to all aspects of the launching process for applications (e.g., multi-media applications) so that even the least computer-literate user is able simply to pop in the distribution medium (e.g., CD-ROM) and use the applications.

Other advantages and features of the invention will become apparent from the following description and from the claims.

DESCRIPTION

FIG. 1 a front view of a personal computer system.

FIG. 3 is an illustration of memory allocation.

FIGS. 5A and 5B are sample initialization and translation files, respectively.

Figure 1:
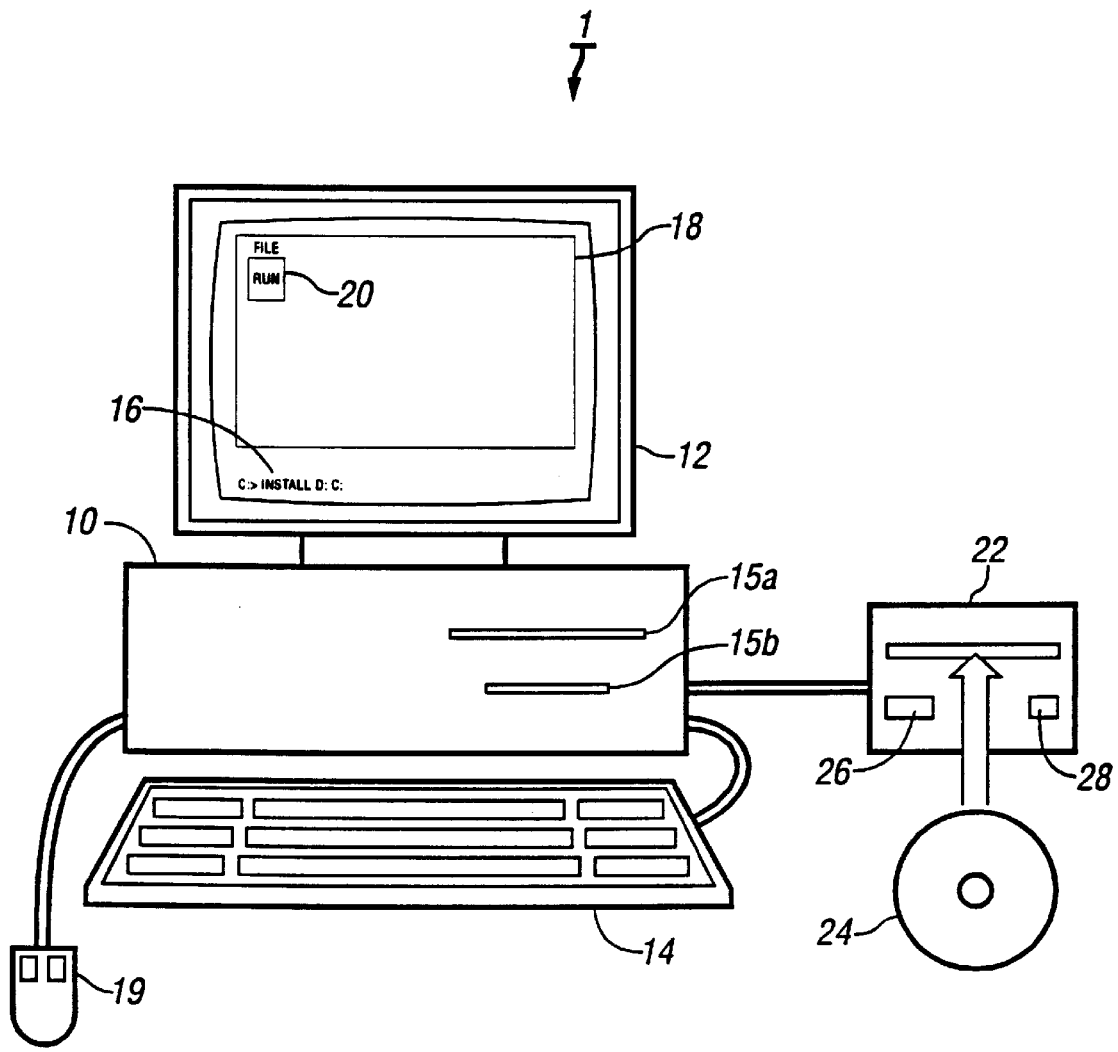
Figure 2:
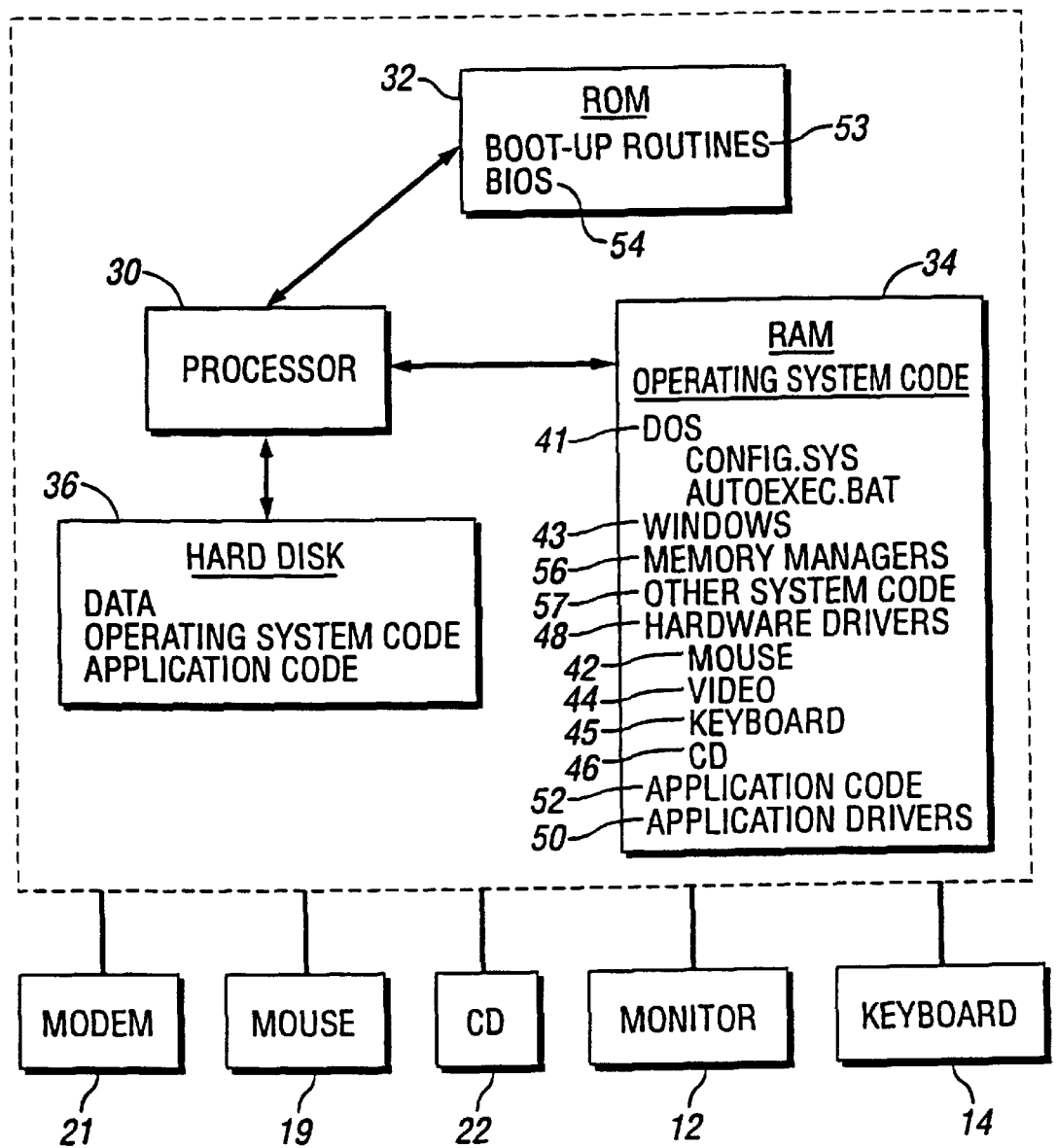
FIG. 2 is a functional block diagram of the computer system.

Referring to FIGS. 1 and 2, a personal computer (PC) 1 has a central processing unit (CPU) 10, an output monitor 12, and input devices, such as a keyboard 14 and disk drives 15a, 15b. The CPU 10 contains a processor 30 which executes programs. The applications are usually installed or loaded to the CPU 10 from diskettes through drives 15a, 15b. The monitor 12 provides a visual interface between the PC and the user.

In PCs, the base operating system is the DOS disk operating system, originally developed by Microsoft for IBM. In a typical DOS-based system, the user may control the operating system by entering recognizable commands on a displayed command line 16. Launching a DOS-based multi-media application may require the user to enter a series of non-intuitive commands through the command line interface. As an alternative, many DOS-based systems are displayed with a Windows operating environment, developed by Microsoft. The Windows environment allows the user to supply commands to the PC by interaction with a graphical user interface (GUI) 18. Using a mouse 19 to select a command from a graphical menu 20 is one example of how this is accomplished.

In addition to the keyboard 14, floppy drives 15a, 15b, or other input device, a compact disk (CD) player 22 may be used to provide applications and large volumes of information (data, text, sounds, video, images) from a CD 24 to the CPU 10. Because the CD 24 is a read-only memory (ROM), information can be retrieved from the CD 24 but cannot be stored to it. Before the CPU 10 can retrieve information, however, the CD player 22 must physically play the CD 24. This may be accomplished when the user presses a play button 26, causing the player 22 to rotate the CD 24 and to prepare its internal electronics to read information from the CD 24. If the CD player 22 has no play button 26, it will begin playing as soon as a CD 24 is inserted. An eject button 28 is pressed when the user is ready to remove the CD 24 from the player 22.

As seen in FIG. 2, processor 30 performs the operations which make the computer function. A read only memory (ROM) 32 stores system firmware, which provides the boot-up routines 53 and a basic input/output system (BIOS) 54. A random access memory (RAM) 34 is used by the processor 30 to store and retrieve data and instructions as it operates. Applications, system code, and data are permanently stored on the system's hard disk 36 and are swapped into and out of RAM as needed by the processor 30 during operation. Included on the hard disk 36 are system files 38 such as the well-known system configuration (CONFIG.SYS) and autoexecution (AUTOEXEC.BAT) files. These files load drivers which configure the system hardware and software resources and set up the CPU at initialization. Other system software 57 promotes a variety of system functions that enable the CPU to operate effectively.

To perform its intended purpose, the CPU 10 must receive information from and provide information to the user. This interaction is accomplished through application code and the operating system environment, such as the DOS environment 41 or Windows environment 43, supported by the computer. The exchange of information is aided by input/output devices such as the mouse 19, keyboard 14, video monitor 12, modem 21 and CD-ROM player 22. Other input/output devices such as printers, scanners, and audio speakers (not shown) may also be used. To engage in this exchange of information, the CPU is equipped with device drivers, i.e., programs which enable the processor to communicate with the external devices. The CPU is also equipped with application drivers 50 which allow the processor to execute the applications 52 that perform the functions required by the user.

Before the processor 30 can execute an application effectively, all of the system resources (hardware and system software) must be properly configured. Each application 52 requires a specific system configuration in order to receive information from and provide comprehensible output to the user. The BIOS 54 (along with the drivers loaded by the configuration and autoexecution files) maintains information about the configuration of the system resources. This information aids the application user in determining how to properly configure the system resources for a particular application. Of course, configuration is not always an easy task even with the assistance of the system BIOS 54.

When executing applications, the processor 30 must often store and retrieve information pertinent to the operations. As a result, the processor 30 must utilize a certain amount of memory 34, depending upon the particular application 52 being run. Because some areas of memory are reserved for specific uses, and because an attempt to store two pieces of information to one area of memory will adversely affect the computer's operation, memory managers 56 are used to organize the locations of programs in the memory and to direct the processor 30 as it accesses memory 34.

Figures 3, 5A:
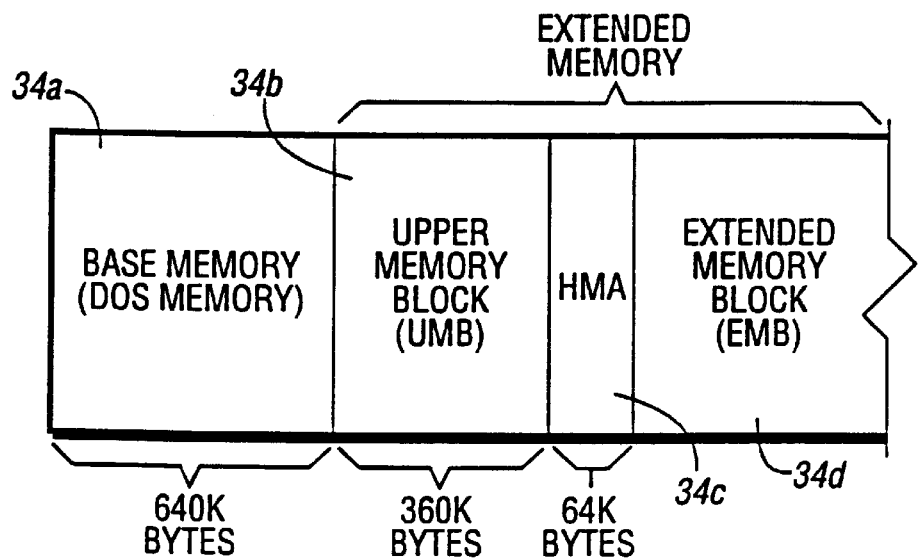

Referring to FIG. 3, memory 34 in a PC consists of several distinct blocks. The first 640K bytes are known as conventional or base memory (or DOS memory) 34a. This memory is the most precious in the system, because most applications will not run without a minimum amount of base memory 34a. In addition to the base memory 34a, most computers have extended memory. Extended memory may include an upper memory block (UMB) 34b between the 640K base and 1M byte boundary. The 64K bytes just above the 1M byte boundary are known as the high memory area (HMA) 34c. Memory above HMA 34c is known as the extended memory block (EMB) 34d. Another way to add memory in excess of the 640K base is through expanded memory, or EMS (not shown).

Although extended and expanded memory are often invaluable to the execution of an application, some applications are unable to utilize one or both of these types of memory. In order to free up base memory 34a for these applications, most computers utilize a memory manager, known as HIMEM.SYS, to load DOS into HMA 34c instead of base memory 34a. For applications that cannot directly use extended memory but can use expanded memory, another memory manager, EMM386, may use extended memory to simulate expanded memory. EMM386 also must be loaded to create the UMB 35b in extended memory. These and other system resources may be provided by the manufacturer of the computer system, or they may be added to the system by the user or by a third party.

Before an application is run, the system must allocate the appropriate amount of each type of memory required by the application. In addition, the appropriate hardware drivers must be installed to insure that the application is able to communicate with the computer and the user. In a DOS-based system, these configurations have traditionally been controlled by the user. In addition, when using an application for the first time, the user has been required to install the application. Installation requires the user to create directories and fill them with files or, at the least, to run an automatic install or set up program. In any event, the user has been required to understand the computer well enough to verify proper installation of applications and proper system resources.

Figure 4:
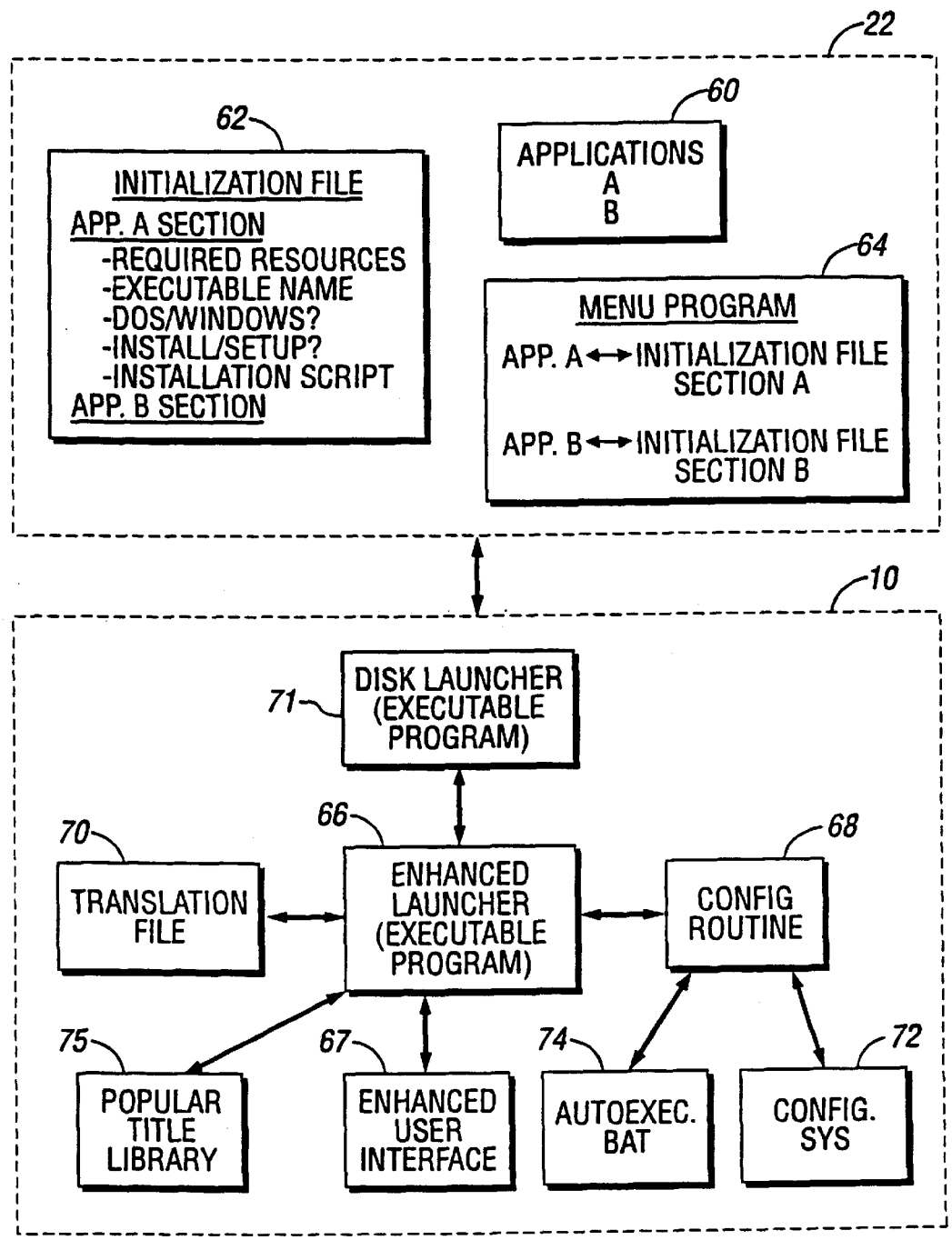
FIG. 4 is a block diagram of the elements of an application launcher.

Referring to FIG. 4, by storing appropriate files on a CD-ROM and in the CPU, it is possible to eliminate much or all of the user's role in installing, configuring, and executing, e.g., multi-media, applications. For this purpose, each CD-ROM 22 on which applications 60 are stored is provided with an initialization file 62, which specifies the types of system resources required to runs each application on the CD. For example, the initialization file 62 may specify that a mouse and a certain amount of extended memory are required to run the application. The file also may list any optional resources which, if available on the system, improve the performance of the application. In addition, the initialization file 62 indicates the executable name of the application and whether or not the application needs to be installed or set up on the system, as well as whether the applications run under DOS, Windows, or both.

If the CD contains multiple applications 60, then an executable menu program 64 on the CD is executed to allow the user to select an application. The menu program 64 links the applications 60 to corresponding sections of the initialization file 62, one for each application.

Stored on the CPU 10 is an executable program known as the enhanced launcher 66, which searches the CD 22 for the initialization file 62 and the menu program 64. When a menu program 64 is found, the enhanced launcher 66 executes the program, which allows the user to select which of the applications on the CD to launch. To do so, the menu program displays a list of the applications contained on the CD, allowing the user to select one for execution.

Before the enhanced launcher 66 starts the application 60, it calls a configuration routine 68, which configures the system resources for the application 60 by interpreting the initialization file 62. To interpret the initialization file 62, the configuration routine 68 reads a translation file 70 pre-stored in the CPU and determines the specific system resource which corresponds to each resource type identified in the initialization file 62. The configuration routine 68 then builds an application-specific configuration file 72 (CONFIG.SYS) and autoexecution file 74 (AUTOEXEC.BAT) which, upon rebooting the system, tailor the computer resources to the requirements of the particular application and run the application. The configuration routine 68 also interprets an installation script in the initialization file 62. The installation script determines whether or not the application 60 needs to be installed or setup and, if so, instructs the enhanced launcher 66 how to do so.

Since many CDs do not contain an initialization file 62, a popular title library 75 is stored in the system. The popular title library 75 contains configuration and installation instructions for many commonly used applications. If the application 60 is stored on a CD without an initialization file but appears in the popular title library 75, the enhanced launcher 66 is able to launch the application without the user's assistance.

In some situations, the user may want to run an application installed on the hard disk. A disk launcher program 71 is used to do this. When executed by the user, the disk launcher 71 either interprets an initialization file stored with the application on the hard disk or interacts with the user to create an initialization file for the application. In either case, the disk launcher 71 calls the enhanced launcher program 66 to configure the system resources and execute the application. Because the application is already installed, no interpretation of an installation script is necessary.

Referring to FIG. 5A, one section of an initialization file has any number of lines which contain keywords 81 identifying system resources required by the corresponding applications. Line 82a, for example, specifies that the application requires 2048K bytes of extended memory (keyword="XMS") to run under DOS, while line 82b specifies that a mouse is required to run the application. The initialization file also contains lines preceded by a prefix 84 ("[O]"), which indicates that the system resource identified by that keyword is optional, i.e., that its availability is not required but preferred to enhance the performance of the application. Line 82c, for example, indicates that the availability of 512K bytes of cache memory would enhance the operation of the particular application. Whether or not an optional resource is used will depend upon the availability of the resource, as well as the availability of the memory required to drive it after memory has been allocated to all of the required resources. Lines containing keywords for optional resources are listed in the order of importance of the resource, so that a more important optional resource appears in the file before a less important optional resource.

The initialization file also contains a line 86 which begins with the keyword "EXECUTABLE". This keyword does not represent a system resource, but instead is followed by the executable pathname of the application, i.e., the cd drive location and filename of the application's executable file. The configuration routine 68 inserts the pathname found in the executable line 86 into the application-specific autoexecution file, thereby enabling the system to automatically execute the application. Following the executable line 86 is the installation script 88, a line of code which, during the configuration routine, determines if the application needs to be installed to the system and, if so, initiates an automatic installation program. Appendix A contains syntax rules and examples for the initialization file. Appendix B contains rules and formats for the installation scripting language.

Referring to FIG. 5B, a translation file also contains keywords 76 which refer to the type of system resource. The keywords 76 in this file match the keywords 81 listed in the initialization file. Below each keyword 76 are device lines 78, each of which lists a specific command which must be executed to access the particular system resource indicated by the keyword 76. Each device line 78 also includes a prefix 80, which indicates whether the device line 78 belongs in the CONFIG.SYS file or the AUTOEXEC.BAT file. If the prefix is "{C}" 80*a*, the configuration routine inserts the device line into the CONFIG.SYS file. If, on the other hand, the prefix is "{A}" 80*b*, the device line 78 is inserted into the AUTOEXEC.BAT file. The device line may also be inserted into the SYSTEM.INI file (prefix="S") or the WIN.INI file (prefix="W"), but this embodiment is not concerned with these files. In addition to designating one of the system files, the prefix 80 may contain a device size 80*c* representing the required memory allocation for the device. The translation file is usually created by the manufacturer of the computer system, but it may be altered or recreated by third-party vendors who add resources and resource managers to the system. Appendix C contains format rules and examples for the translation file.

Figure 6A:
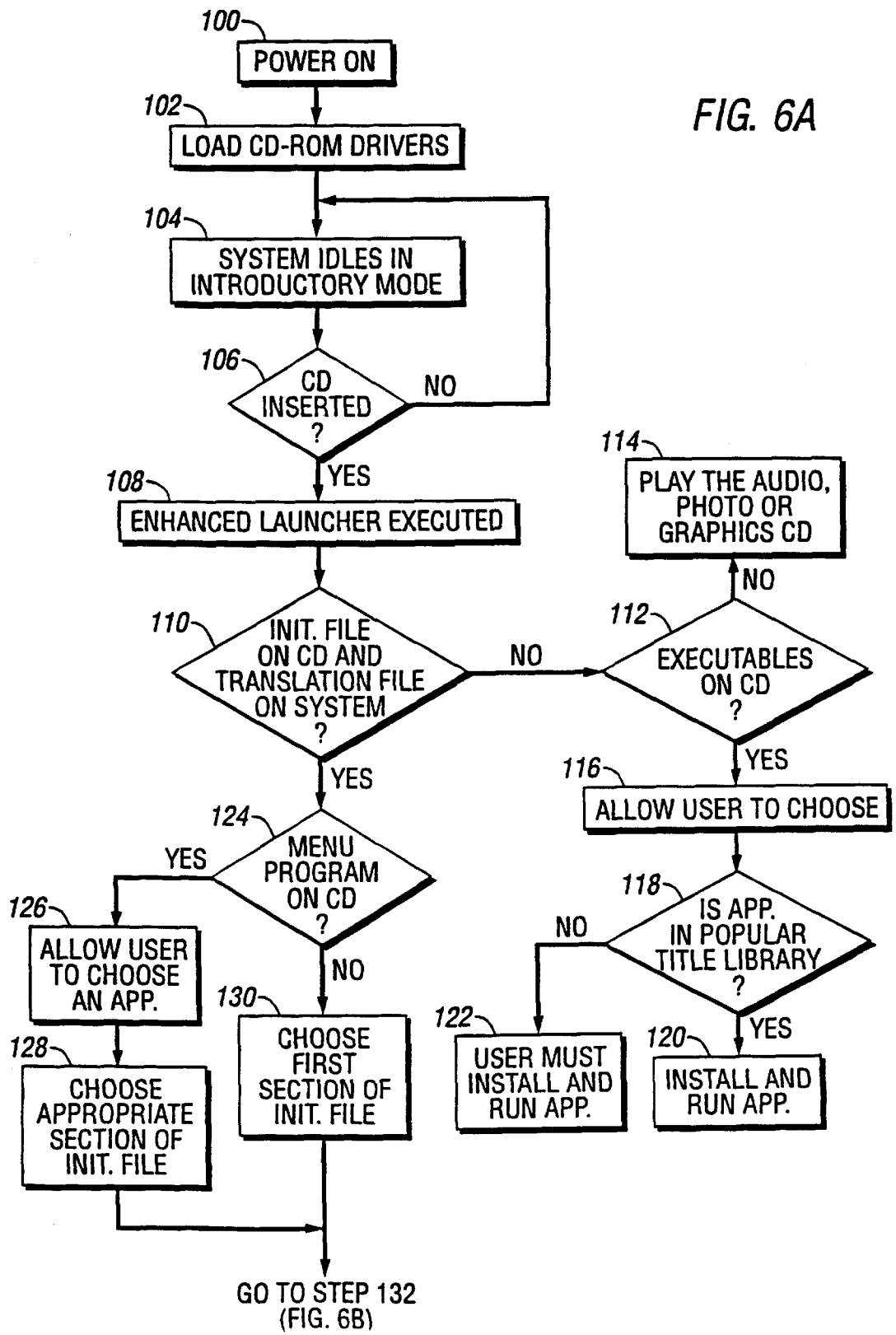
FIGS. 6A, 6B and 6C are flow diagrams for launching a CD-based application on a single-tasking computer system.
Figure 6B:
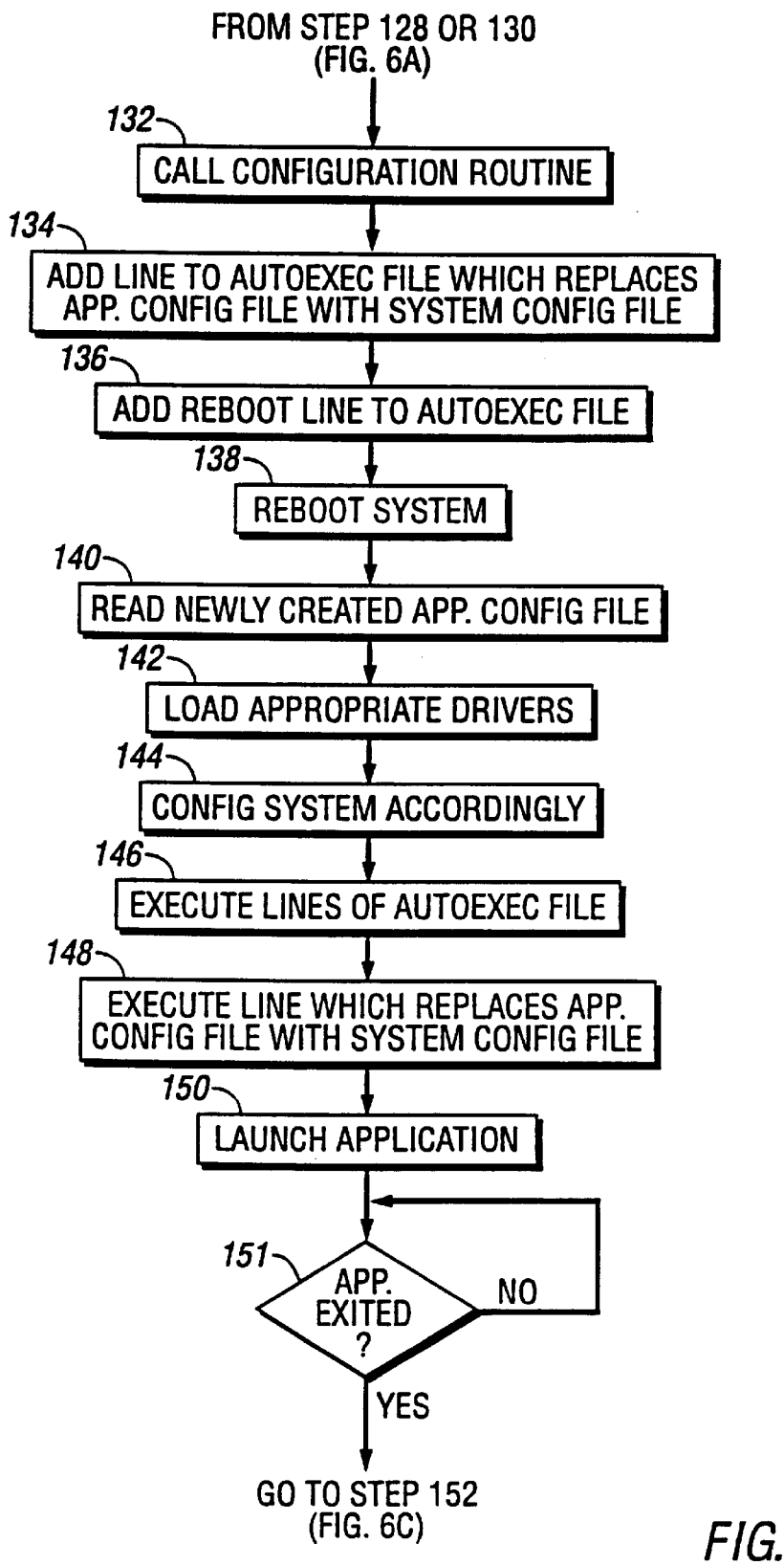
Figure 6C:
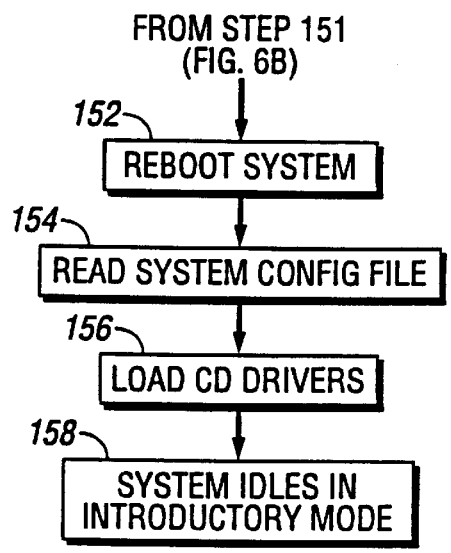

Referring to FIGS. 6A and 6B, one embodiment of the application launcher operates in a single-tasking computer system. A single-tasking system is a system (e.g., a classic DOS system) on which each application is run independently. In other words, each application has its own unique system files, and no application may be run while another is in execution. When the single-tasking system is powered-on 100, the CD-ROM drivers are loaded 102 and the system waits 104 in an introductory mode for a CD to be inserted 106 into the CD player. When a CD is inserted, the enhanced launcher program is executed 108.

Figure 9A:
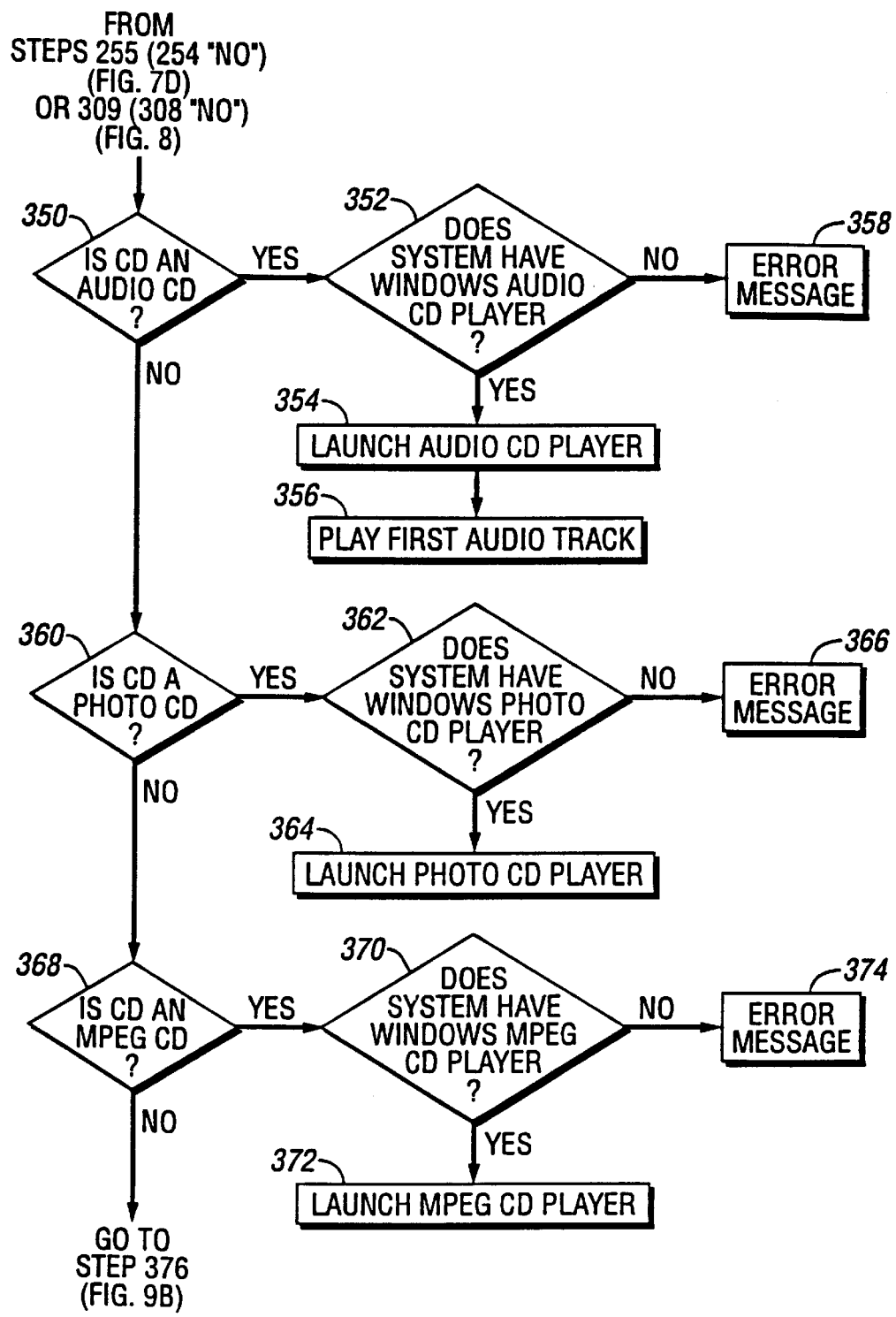
FIG. 9 is a flow diagram for launching an audio, photo, or graphics CD.
Figure 9B:
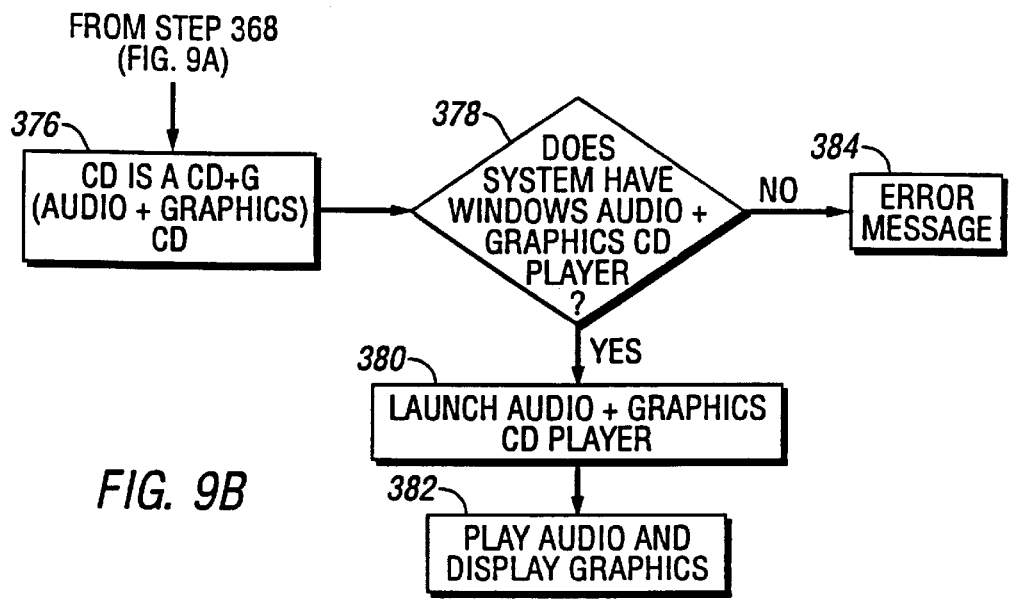

The enhanced launcher determines 110 if the CD contains an initialization file and the system contains a translation file. If either file is not present, the enhanced launcher searches 112 for executable files on the CD. If none exists, the CD is assumed to be an audio, photo, or graphics CD and the system simply plays it 114 (FIG. 9). If the CD does contain executables, the enhanced user interface displays them and allows 116 the user to choose one to run. The launcher then determines 118 whether or not the system configuration for the chosen application appears in the popular title library. If so, the launcher installs and runs 120 the application. Otherwise, the user must install and run 122 the application.

Returning to step 110, if the initialization and translation files are present, the system determines 124 whether or not the CD contains the menu program (i.e., if there are multiple applications). If the program is found, it is executed, and the user interface displays a list of the applications on the CD and allows 126 the user to select one. The program returns a number corresponding to the selected application. The enhanced launcher then chooses 128 the section of the initialization file corresponding to the number returned. If the CD contains only a single application, or if the menu program does not appear on the CD, the launcher chooses 130 the first section of the initialization file. Once the appropriate section of the initialization file has been found, the enhanced launcher calls 132 the configuration routine.

Figure 11A:
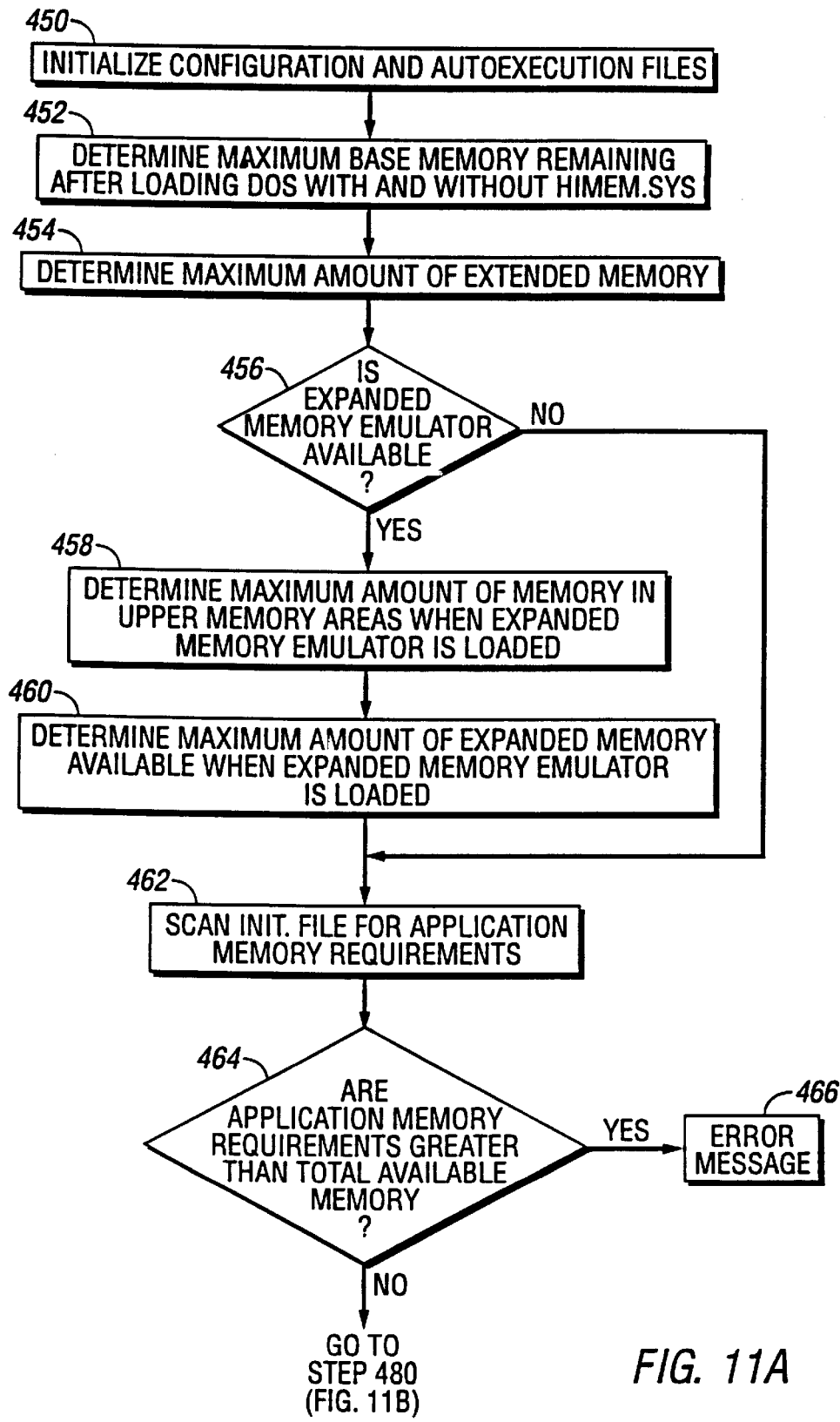
FIGS. 11A–11D are flow diagrams for interpreting a CD-based initialization file.
Figure 11B:
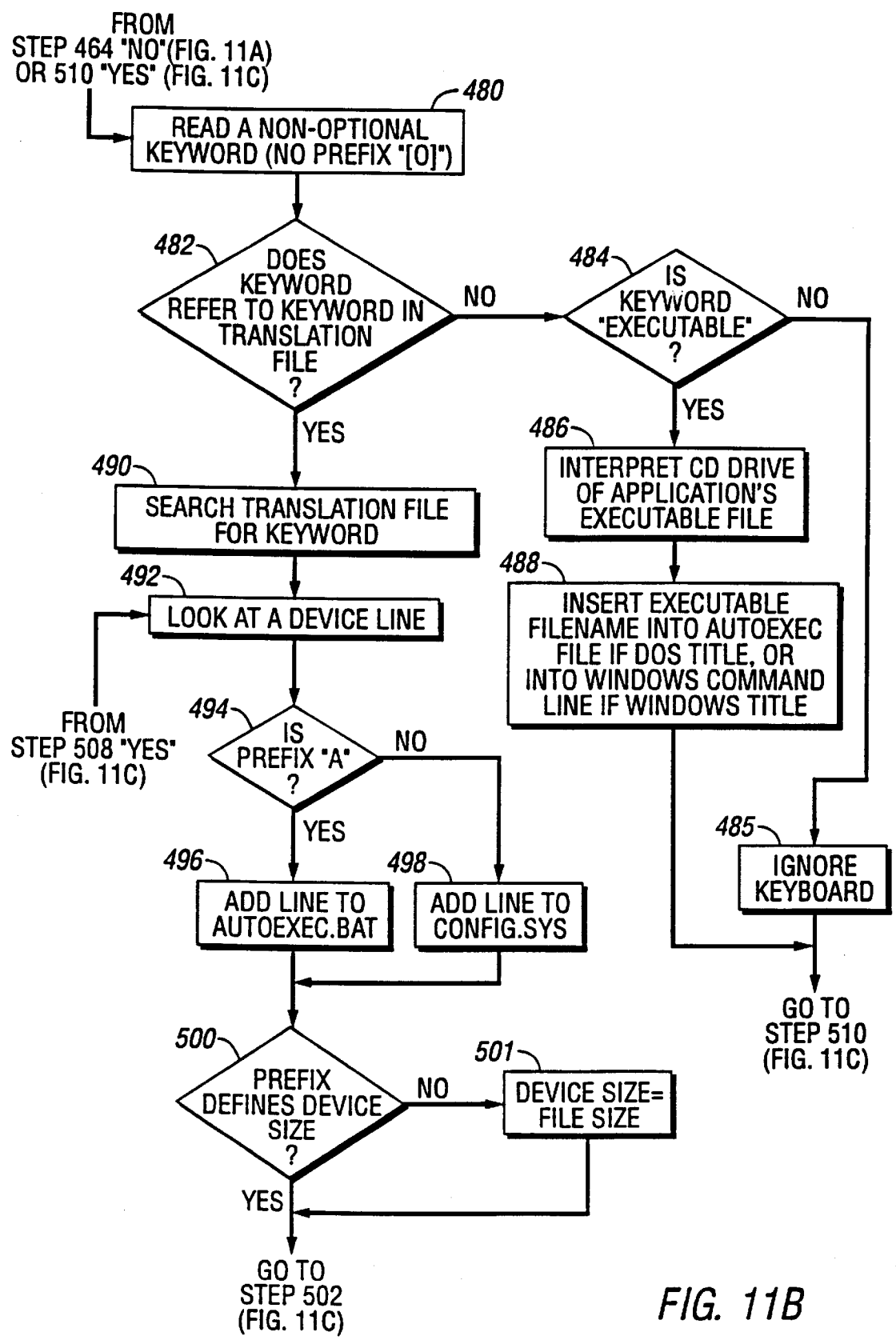

To build the application-specific configuration and autoexecution files, the configuration routine makes four passes through the initialization file. Referring to FIG. 11A, the configuration and autoexecution files are initialized 450, and the total amount of free memory is determined. First, the maximum available base memory is determined 452 when DOS is loaded with and without the HIMEM memory manager. The amount of available extended memory is then determined 454. If the EMM386 expanded memory emulator is available 456, the routine determines 458, 460 the maximum amount of memory available in the upper memory areas and in expanded memory when the emulator is loaded. The initialization file is then scanned 462 the first time to determine the total memory requirements for the application. If the amount required exceeds the amount available 464, an error message is displayed 466 to the user.

Referring to 11B, if the system can provide enough memory to the application, a second pass through the initialization file interprets each of the non-optional keywords. A non-optional keyword is one which describes a system resource mandatory for execution of the application. These keywords are not preceded by the prefix ("[O]"). After the first keyword in the file is read 480, the configuration routine determines 482 whether or not the keyword refers to a device in the translation file. If not, the routine determines 484 if an "EXECUTABLE" keyword has been found. If this is not the case, the keyword is ignored 485 and the routine goes on to the next keyword. If the keyword is "EXECUTABLE", it is followed by the CD drive name and the filename of the application's executable file. The routine interprets 486 the drive name and inserts 488 the executable filename as the last line in the autoexecution file. If the application is a Windows title, the executable filename is inserted 488 into a Windows command line. The routine then moves to the next keyword.

Returning to step 482, if the keyword refers to the translation file, the translation file is searched 490 for the keyword. When the keyword is found, the first device line following the word is viewed 492 to determine 494 the line's prefix. A line with the prefix "A" is added 496 to the autoexection file, while a line with the prefix "C" is added 498 to the configuration file. If the prefix does not define 500 a device size (i.e., a number indicating the memory required to operate the device), the device size is defined 501 as the size of the device file. If sufficient upper memory is available 502, the device size is subtracted 504 from the amount of free upper memory. If insufficient upper memory is available, the device size is subtracted 506 from the amount of free base memory. In other words, when a device requires additional memory, upper memory should be used unless an insufficient amount is available.

The routine then searches 508 for another device line under the keyword and repeats the steps above to add it to the appropriate file. When all of the device lines have been added, the second pass continues until no non-optional keywords remain 510.

Figure 11C:
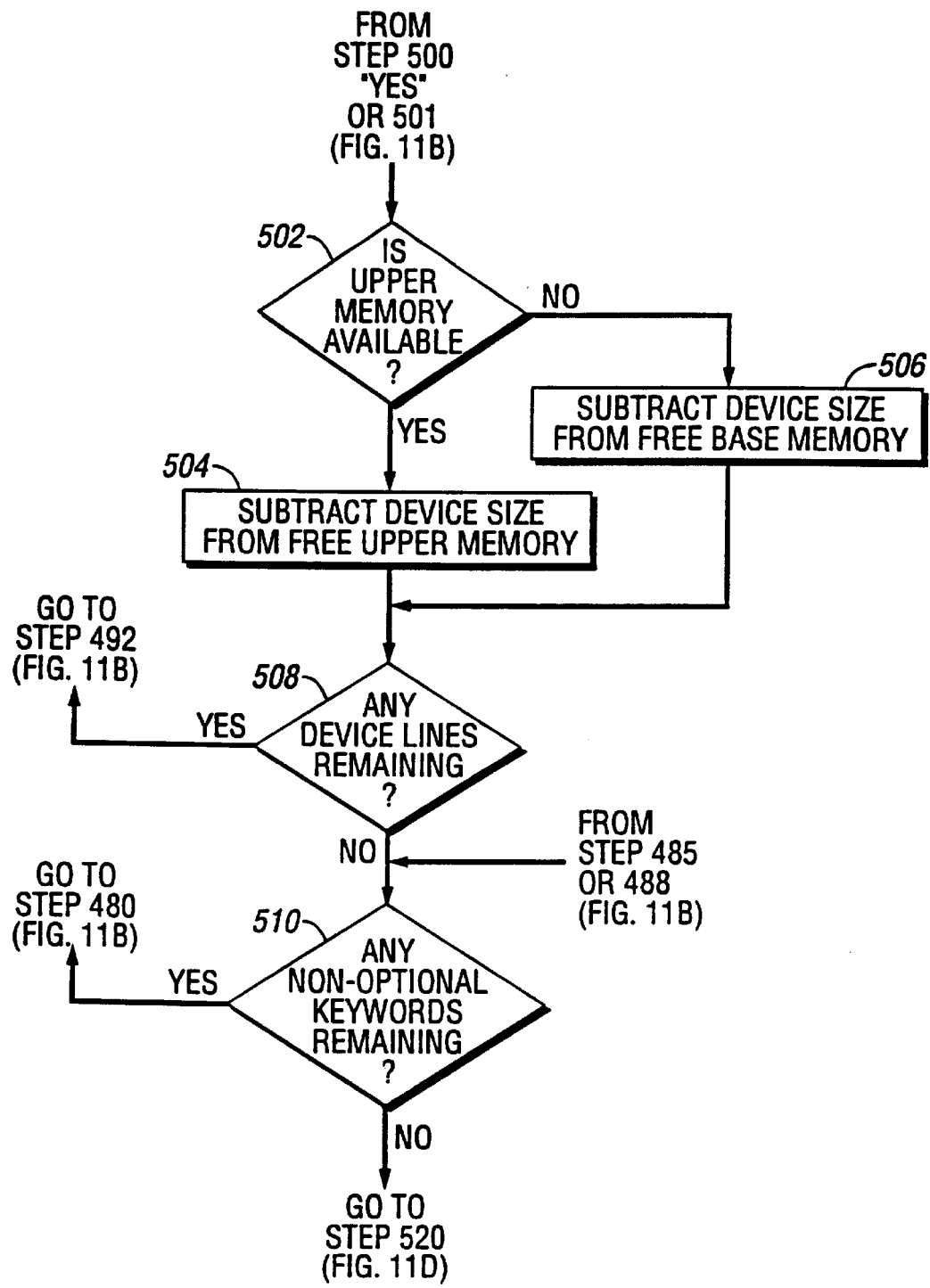

Referring to FIG. 11C, the third pass adds the optional device lines to the appropriate file. The first optional keyword is read 520 from the initialization file, and the routine determines 522 if the keyword refers to the translation file. If not, the keyword is ignored 524. As with non-optional keywords, the translation file is searched 526 for the optional keyword, and the first device line under the keyword is viewed 528. The routine then determines 530 if enough memory is available to operate the device. If so, and if the prefix on the device line does not define 532 a device size, the device size is defined 533 as the size of the device file. If the system determines 534 that sufficient upper memory is available, the device size is subtracted 536 from the amount of free upper memory. If upper memory is not available but base memory is available 538, the device size is subtracted 540 from the amount of free base memory. The device line is then added to the autoexecution file 544 or configuration file 546, according to its prefix 542.

When the line has been added to the appropriate file, any other device lines under the keyword are added 548. The third scan of the initialization file then continues until no optional keywords remain 550.

Figure 11D:
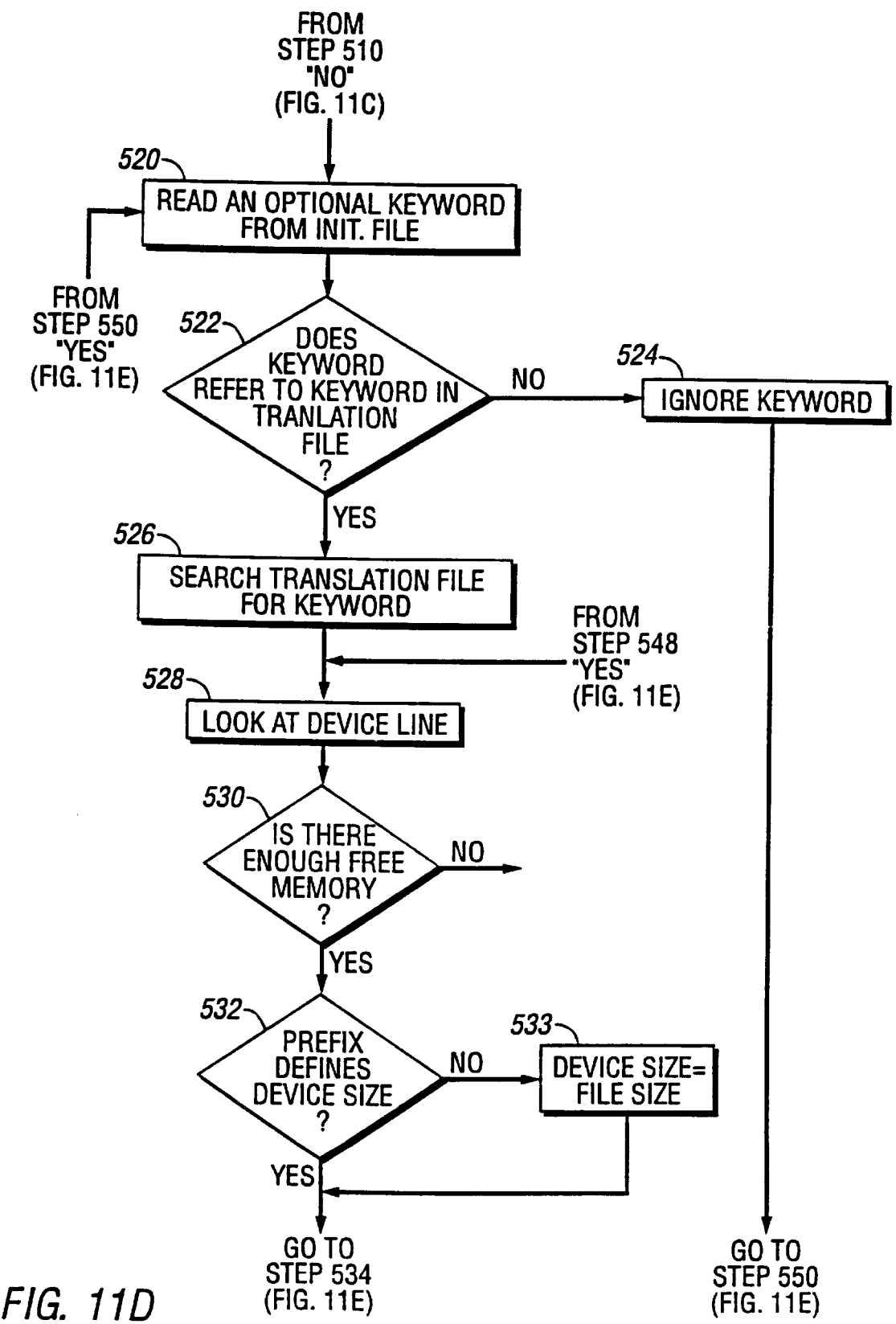
Figure 11E:
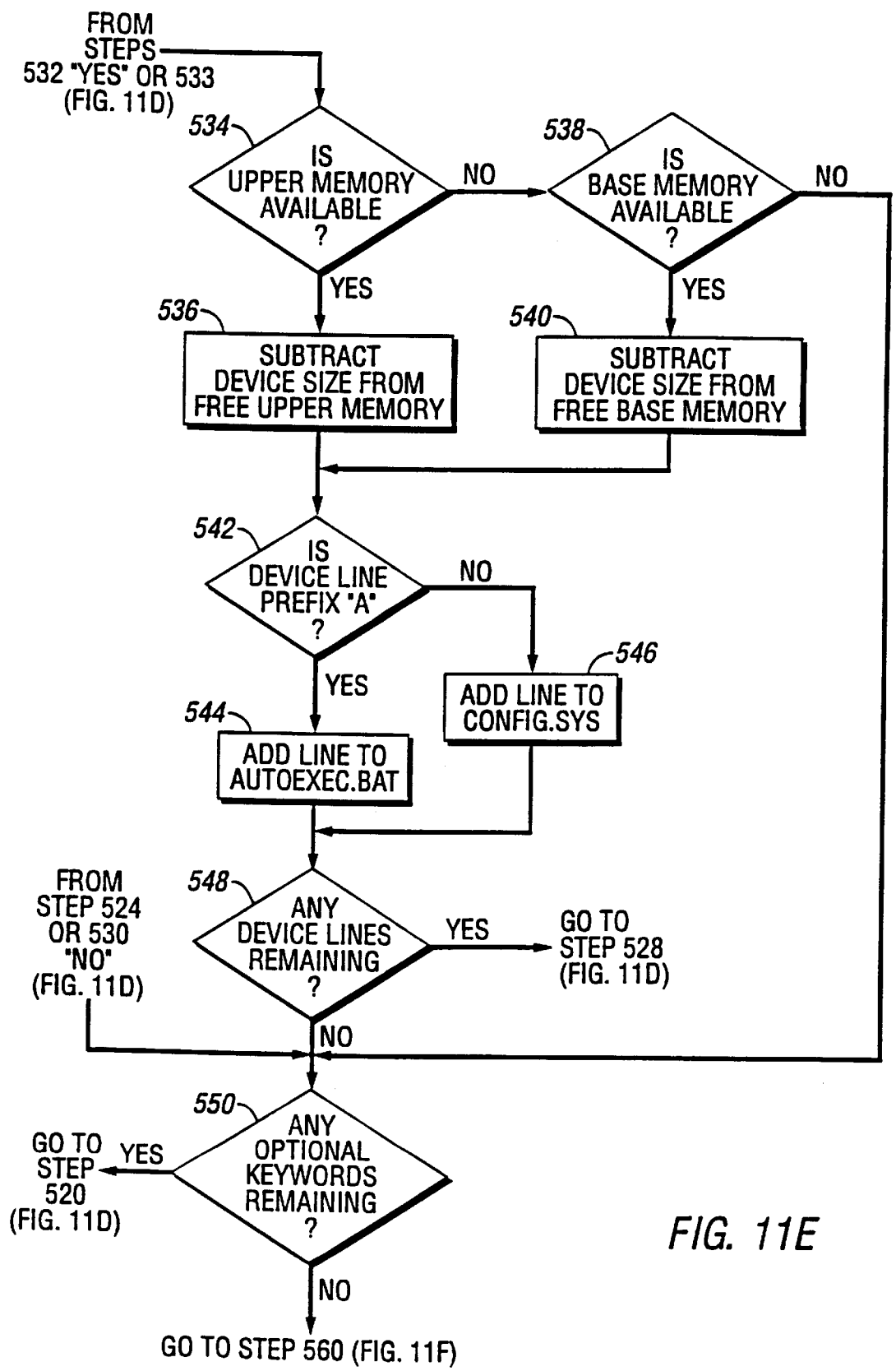
Figure 11F:
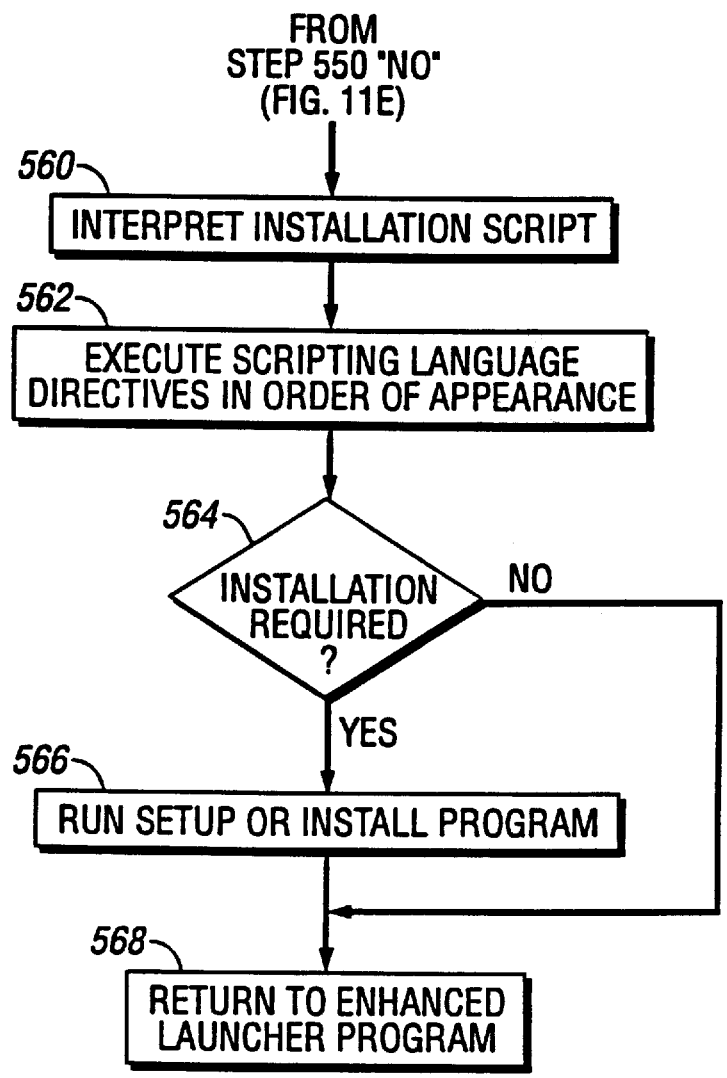

Referring to FIG. 11D, after all devices have been added to the configuration and autoexecution files, the installation script in the initialization file is interpreted 560. The scripting language directives are executed 562 in order of appearance in the script. If the script determines 564 that the application must be installed, the routine calls an automatic setup or install program (of the kind typically used) to install the application from the CD to the computer system. The configuration routine then returns 568 control to the enhanced launcher program.

Referring again to FIG. 6A, a line must be added 134 to the autoexecution file which replaces the application-specific configuration file with the system configuration file just prior to execution of the application. The autoexecution file is also altered to add 136 a line which forces the system to reboot when the application is exited. These lines are necessary to ensure that the system is properly configured to reenter the introductory screen when the application is exited.

Referring to FIG. 6B, after the autoexecution file is constructed, the system is rebooted 138, and the newly created application-specific configuration file is read 140. The appropriate drivers are loaded 142, and the system is configured accordingly 144. The lines of the newly created autoexecution file are executed 146, including the line which replaces 148 the new configuration file, now executed, with the system configuration file. After the system configuration file is in place, the application is launched 150, with no participation by the user.

The system remains inactive until the user exits the application 151, and then the last line of the autoexecution file is executed 152, thereby rebooting the system. During reboot the system configuration file is read 154, the CD drivers are loaded 156, and the system waits 158 in the introductory mode for another CD to be inserted. When a CD is inserted, the enhanced launcher is again executed, beginning the process anew.

Figure 7A:
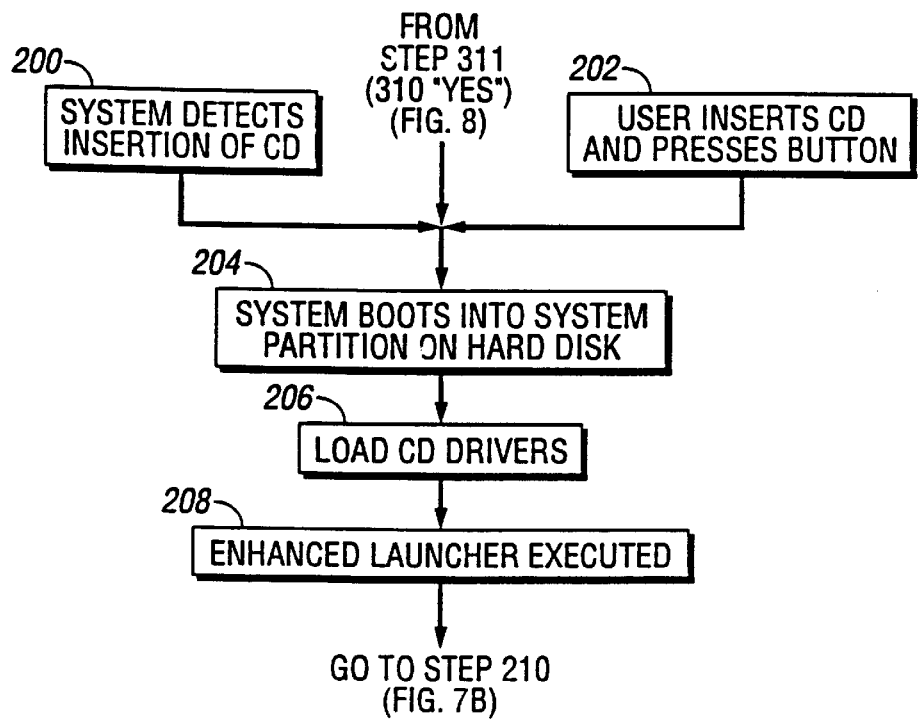
FIGS. 7A, 7B, 7C, 7D and 7E are flow diagrams for launching a CD-based application on a PC running DOS.

Referring to FIG. 7A, when the computer is a PC running DOS, a DOS TSR may either detect 200 the insertion of a CD, or, preferably, the system may wait for the user to press 202 the play button on the CD player. When one of these events occurs, the system would boot 204 into a system partition on the hard disk. The system partition loads 206 the CD drivers and executes 208 the enhanced launcher. If the CD is a DOS title CD 210, the system determines if both the initialization file and the translation file are present. If not, the applications in the main directory of the CD are listed 214, and the user selects 216 one. If the selected application appears 218 in the popular title library, the configuration files are retrieved from the library by the enhanced launcher, and the application is installed and run 220. If not in the library, the application is installed and run 222 by the user.

If the initialization and translation files are found, the enhanced launcher creates 224 backup copies of the system configuration and autoexecution files. The backups may be stored onto any storage medium in or accessible to the computer system. The enhanced launcher then determines 225 whether or not the CD contains the menu program. If so, the program is executed and the user selects 226 an application. The menu program returns a number corresponding to the selected application, and the appropriate section of the initialization file is found 228 by the launcher program. If the menu program is not found, the first section of the initialization file is chosen 230. The configuration routine is then called 232, and the application-specific configuration and autoexecution files are created and the installation script executed as discussed above.

When the configuration routine is exited, the system is rebooted 234, and the newly created configuration file is read 236. The appropriate drivers are loaded 238, and the system is configured accordingly 240. The lines of the autoexecution file are executed 242, and the application is launched 244. When the user exits 246 the application, the enhanced launcher reboots 248 the system into the system partition of the hard disk, where the original system configuration and autoexecution files are restored 250. The system is then rebooted into DOS, where the system is configured according to the original system configuration and autoexecution files. If the application is not exited normally, e.g., the system is powered-down while the application is running, the system will boot into the system partition of the hard disk. The system configuration and autoexecution files will then be restored, and the system will be rebooted into DOS.

Figure 7B:
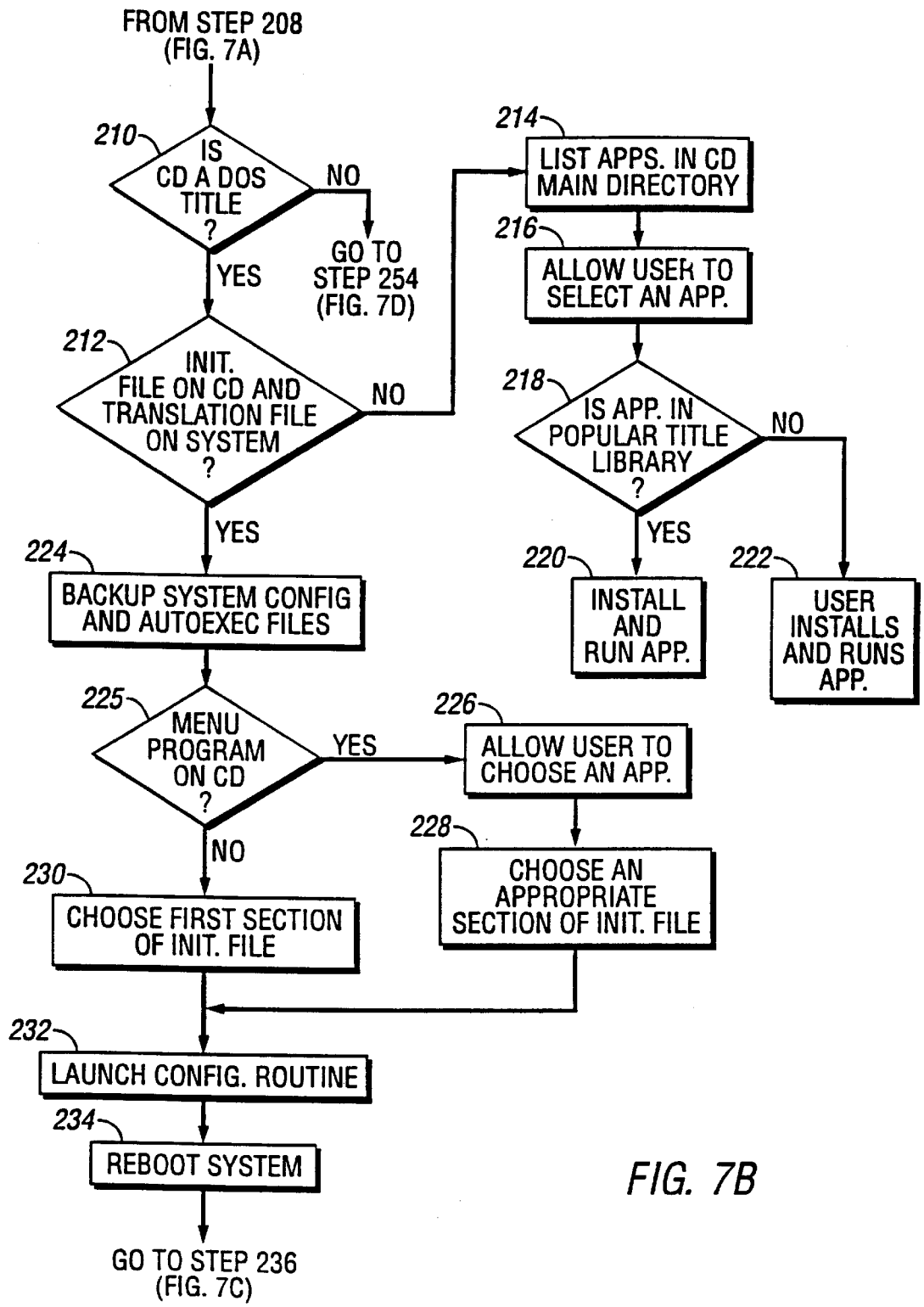
Figure 7C:
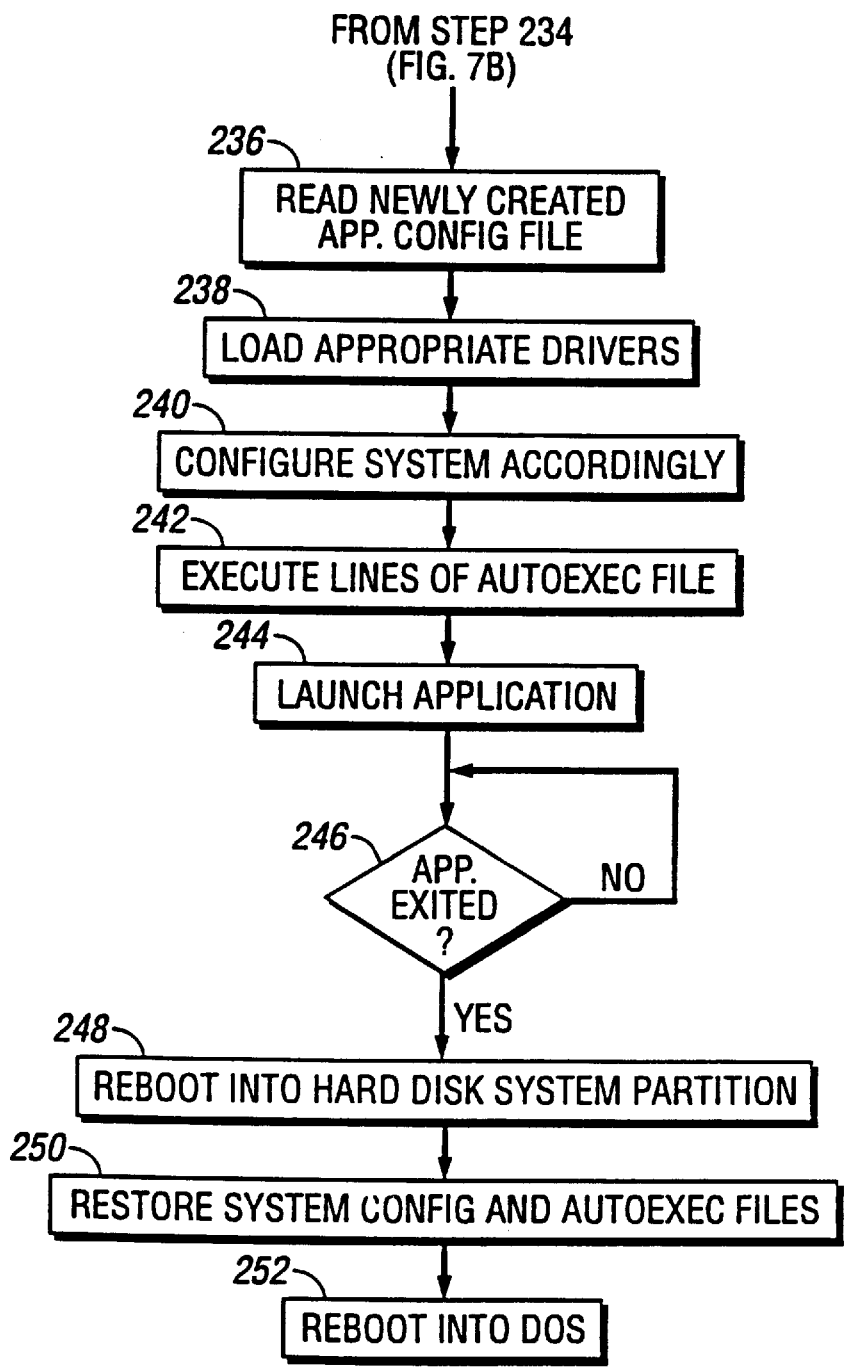
Figure 7D:
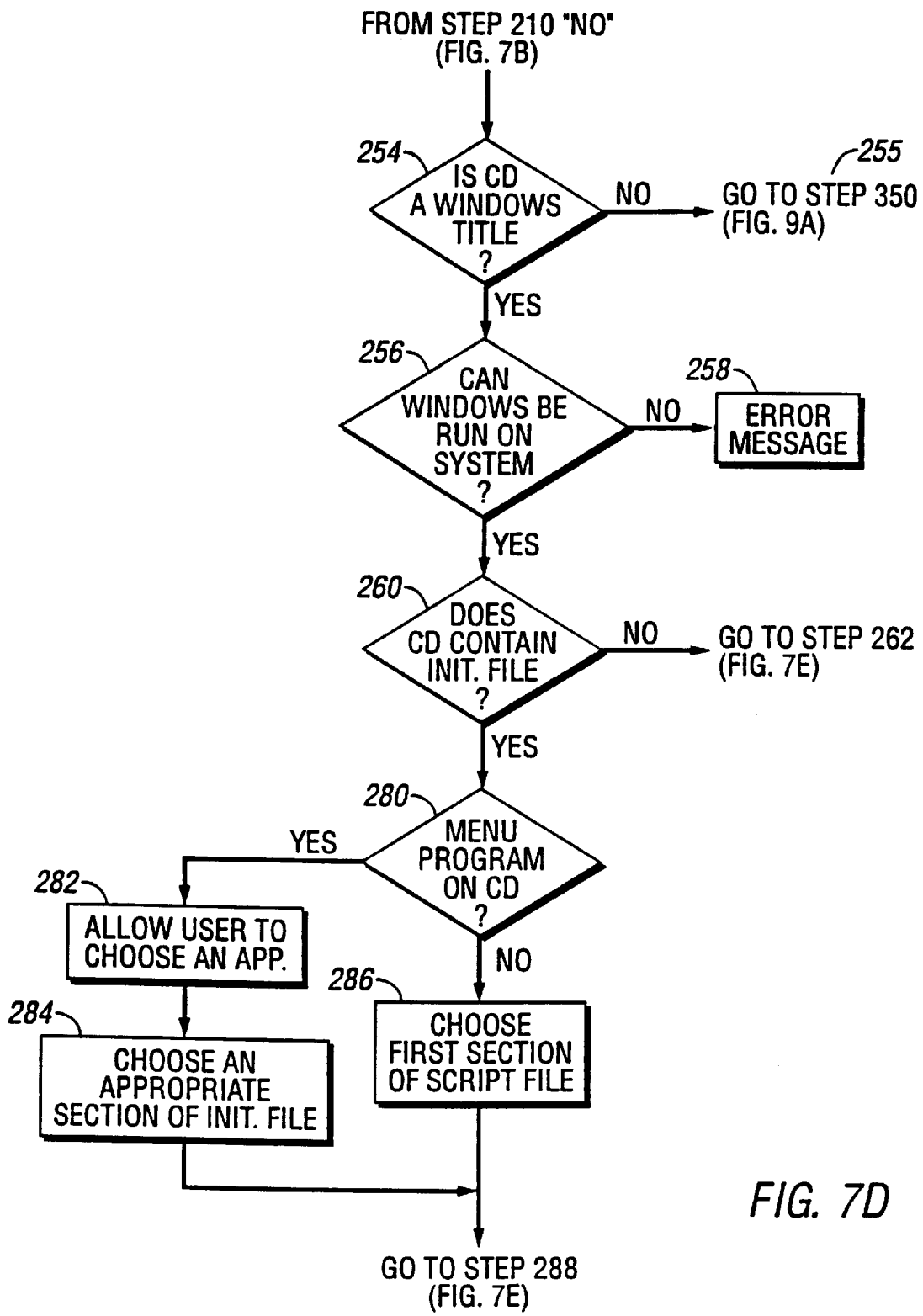
Figure 7E:
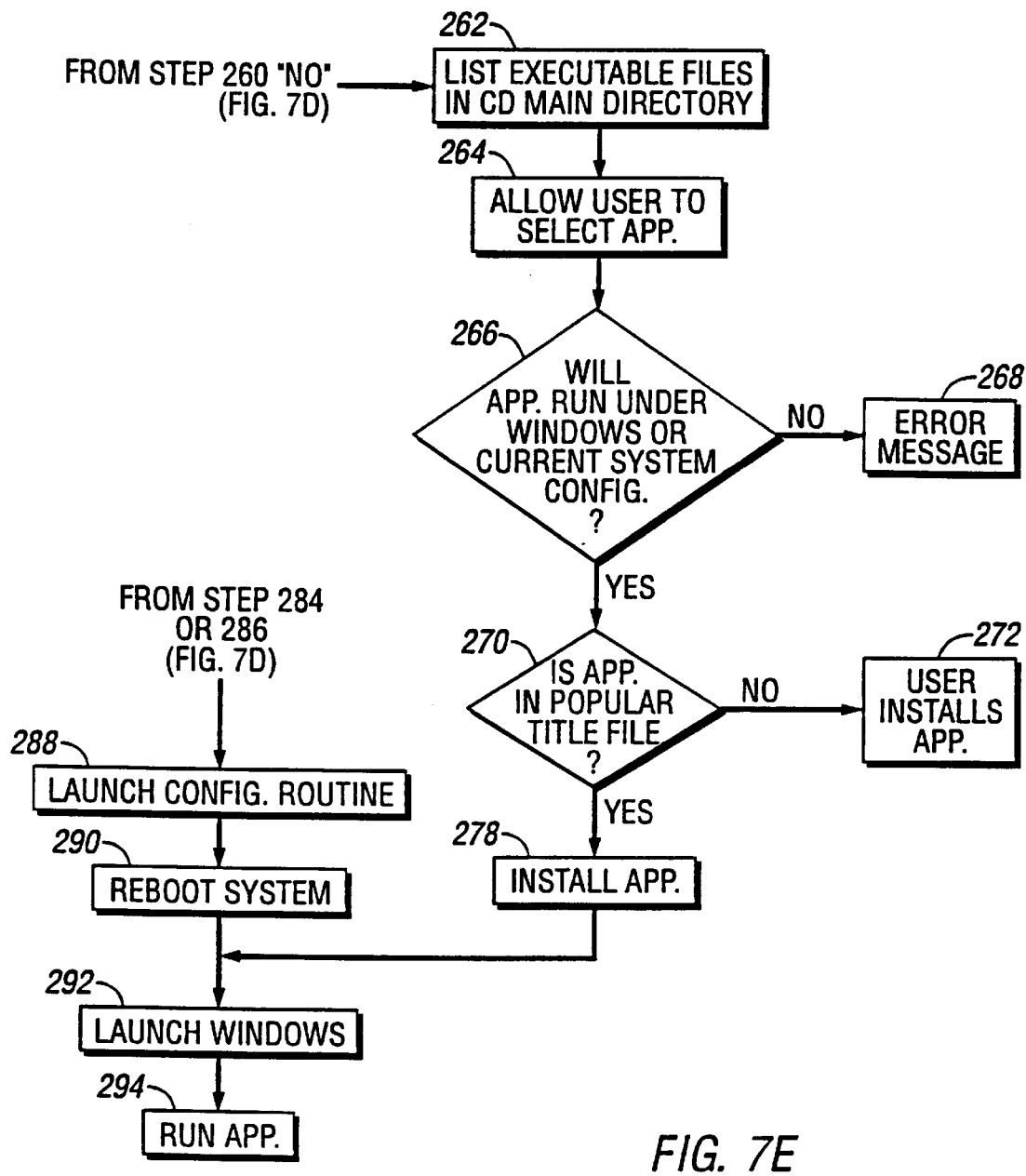

Returning to step 210, the enhanced launcher may determine 211 that the CD is not a DOS title CD. Referring to FIG. 7B, the program then determines 254 whether or not the CD is a Windows title CD. If so, since the system is running DOS, the launcher program must determine 256 if Windows is available to run on the system. If not, the user receives 258 an error message. If so, the program determines 260 if the CD contains an initialization file. If no initialization file is found, the enhanced user interface lists 262 the applications found in the main directory of the CD and allows 264 the user to select one. The program then determines 266 if the application runs under Windows, sending 268 an error message to the user if not. The program then determines 270 if the application appears in the popular title file. If not, the application is installed and run 272 by the user. However, if it is found in the library, the application is installed 278 and then run after the enhanced launcher launches Windows.

If an initialization file is found on the CD, the enhanced launcher searches 280 for the menu program. If the program is found, the user selects 282 an application, and the appropriate section of the initialization file is found 284 by the launcher program. If the menu program is not found, the first section of the initialization file is selected 286. The configuration routine is then called 288, as discussed above. After the configuration routine is exited and the system is rebooted 290, the launcher program launches Windows 292 and runs 294 the Windows application.

For DOS applications, instead of booting into a system partition on the hard disk, the enhanced launcher may be implemented in other ways. One way is to customize DOS so that during a system boot, the enhanced launcher program is executed, and thus the initialization file is interpreted and the application-specific configuration and autoexecution files are created, before the system configuration is read.

With this approach, only a single system boot is needed to execute the enhanced launcher program. In another scheme, the system configuration file is modified so that the first driver executes the enhanced launcher (thereby creating the application-specific files) and then reloads the system boot code. Another implementation provides for a special system boot record stored on the CD. The boot record must include information about the hardware device drivers. When the CD is inserted, the system recognizes its presence, automatically boots from the CD and runs the configuration routine.

Figure 8:
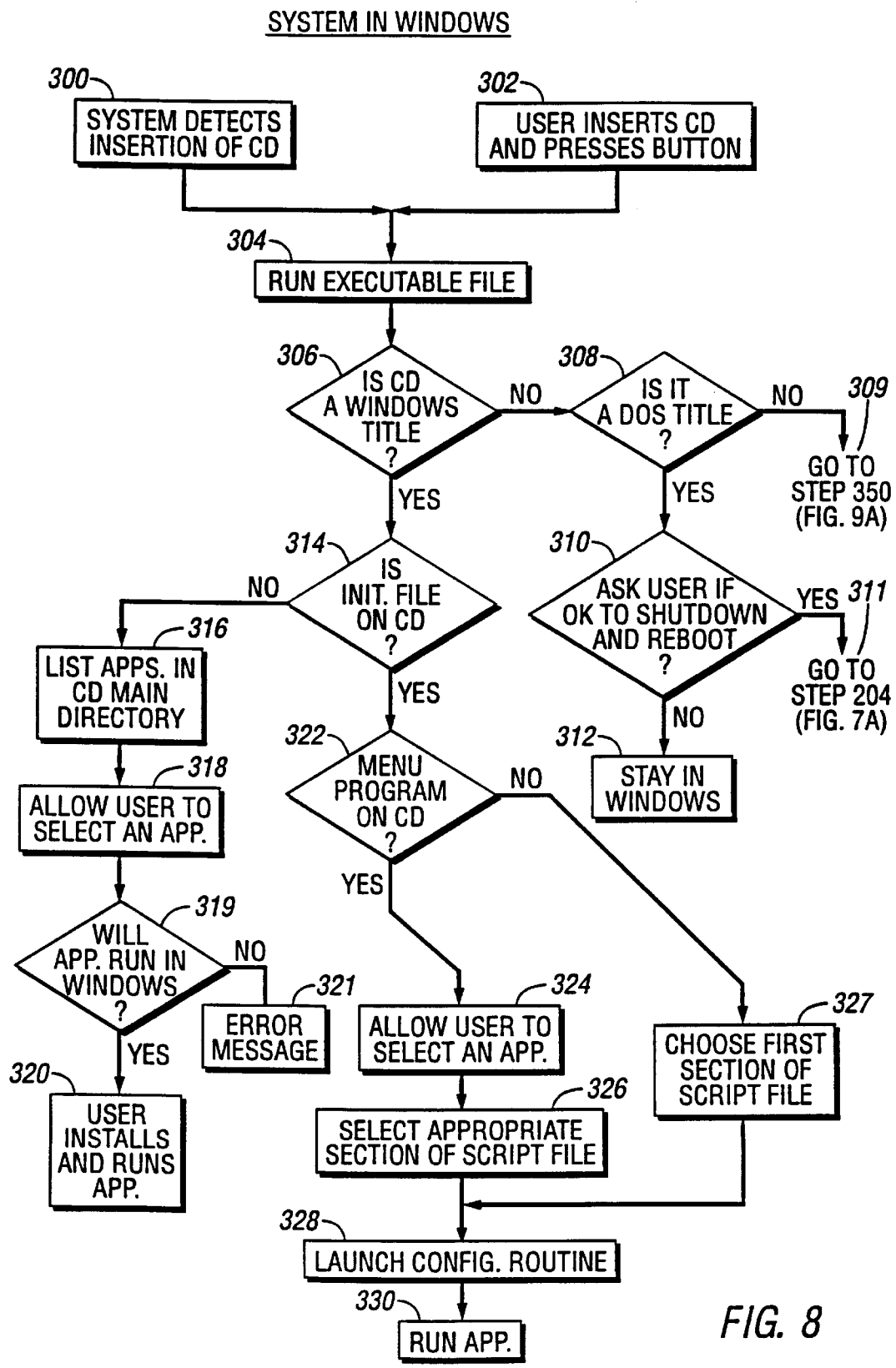
FIG. 8 is a flow diagram for launching a CD-based application on a PC running Windows.

Referring to FIG. 8, launching an application in a PC running Windows is less complex than in a machine running DOS. As with DOS, Windows may either detect 300 the insertion of a CD with the Windows TSR, or it may wait for the user to press 302 the play button on the CD player. In either case, the enhanced program launcher is executed 304. The launcher program must first determine 306 if the CD is a Windows title CD. If not, the program then determines 308 if it is a DOS title CD and, if so, asks 310 the user if it may reboot the system into DOS. If the user approves the reboot, the enhanced launcher reboots to the system partition of the hard disk (step 204 in FIG. 7A). If the user refuses, the system remains 312 in Windows.

If the CD is a Windows title CD, the launcher program searches 314 for an initialization file. If none exists on the CD, all applications in the main directory of the CD are listed 316, and one is selected 318 by the user. The launcher then looks 319 for the standard string "This application requires Microsoft Windows." If the string is found, the user may install and run 320 the application. Otherwise, an error message is provided 321 to the user.

If an initialization file was found on the CD, the program searches 322 for the menu program. If the menu program exists, it is executed and the user selects 324 an application to run. The enhanced launcher then finds 326 the appropriate section in the initialization file. If the menu program does not exist, the first section of the initialization file is chosen 327. The enhanced launcher then launches 328 the configuration routine. However, because Windows does not require the construction of configuration and autoexecution files, the first three passes through the initialization file are not performed. Instead, the configuration routine interprets only the installation script (FIG. 11D), determining if the Windows application needs to be installed and calling an automatic installation program if it does. When the configuration routine is complete, the launcher program executes 330 the Windows application.

Referring to FIG. 9, when the enhanced launcher, whether running under DOS or Windows, determines that an inserted CD is not a DOS or Windows title, it determines 350 if the CD is an audio CD. If so, and if the system has a Windows audio CD player 352, the audio CD player is launched 354 and the first track of the CD is played 356. If no audio CD player is available on the system, an error message is displayed 358 to the user.

If the CD is not an audio CD, the launcher program determines 360 whether or not it is a photo CD. If so, and if the system has a Windows photo CD player 362, then the photo CD player is launched 364 and the CD is played. If no photo CD player exists, an error message is provided 366. If the CD is an MPEG (graphics) CD 368, the launcher program searches 370 for a Windows MPEG CD player. If the player is found, it is launched 372; otherwise, an error message is displayed 374. Finally, if the CD is none of the above types, it is assumed that the CD is an audio plus graphics (CD+G) CD 376, so the launcher program searches 378 for a Windows CD+G player. If it is found, the player is launched 380, and the CD audio is played while the graphics are displayed 382. If the Windows CD+G player is not found, an error message is provided 384 to the user.

Figure 10:
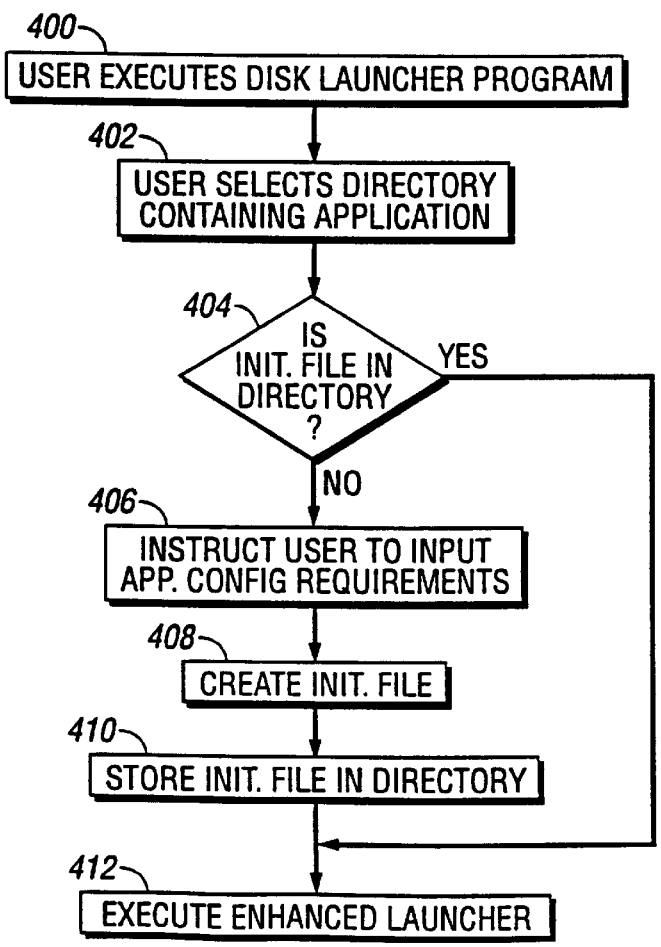
FIG. 10 is a flow diagram for launching an application installed to the hard disk.

Referring to FIG. 10, a disk launcher program (71 in FIG. 4) uses the enhanced launcher to launch applications installed to the system hard disk. To launch an installed program, the user invokes 400 the disk launcher program, specifying 402 the directory on the hard drive which contains the application to be launched. The disk launch program searches 404 for an initialization file in the directory and executes 412 the enhanced launcher if one is found. If no initialization file exists, the disk launcher directs the user to the application documents and instructs 406 the user to input the configuration requirements. The program then creates 408 an initialization file from the configuration requirements and stores 410 the file in the application directory. The enhanced launcher is then invoked to configure the system and launch the application. Since the application is already installed on the hard disk, the installation section of the configuration routine is eliminated.

Other embodiments are within the scope of the following claims.

APPENDIX A

The Initialization File

The initialization file is designed by the CD application developer to describe the optimal run conditions for the application on the CD. It will include both optional and required resources. The optional resources like a disk cache will be marked with an [O]. The initialization file can also specify whether it is necessary to run a setup program before running the actual application.

The characters space and tab are referred to as *white space* characters and are treated equivalently. White space characters serve to separate other syntactic constructs such as names and numbers from each other. Any number of consecutive white space characters are treated as if there were just one.

White space is any string of one or more tab of space characters.

The characters carriage-return (CR) and line-fee (LF) are also called *newline* characters. A CR followed immediately by an LF are treated together as one newline character.

A comment is introduced by any line that begins with a colon (:), semi-colon (;), slash (/), percent (%), or pound sign (#) character. The line may begin with arbitrary white space. The comment extends to the next newline character.

*Resource Configuration Language:*

DOS memory

DOS memory is defined as memory under 640K. This memory is perhaps the most precious memory in the system. Many applications require a minimum amount of DOS memory.

```
SYNTAX:    DOSMEM = 400K
```

- 1 -
25

ACTION: The configuration routine will load other drivers high, as appropriate, in order to achieve requested free DOS memory space.

Expanded memory

Expanded memory is defined as memory available through the Lotus Intel Microsoft (LIM) Expanded Memory Specification Version 4.0. The EMS interface allows application programs to access up to 32 MEG.

SYNTAX: EMS
EMS = 64K

ACTION: The configuration routine will add the appropriate expanded memory handler to the CONFIG.SYS. It is up to the system translation file to specify if pages are to be excluded.

Extended memory

The Extended Memory Specification Version 2.0 provides a standard method for addressing memory in three regions of the system address space: 1) The 64K (-16 bytes) of memory just above 1 MEG -- HMA, 2) Memory between 640K and 1M - UMB, 3) Memory above 1M -- EMB.

SYNTAX: XMS

ACTION: The configuration routine will add the appropriate extended memory handler to the CONFIG.SYS

VCPI

The Virtual Control Program Interface (VCPI) Version 1.0 is an extension to the EMS specification. It allows multiple DOS programs to share memory.

SYNTAX: VCPI

ACTION: The configuration routine will add the appropriate handler to CONFIG.SYS

DPMI

The DOS Protected Mode Interface (DPMI) Version 0.9 allows DOS programs to access memory beyond the first megabyte. DPMI provides a subset of DOS and BIOS function.

SYNTAX:   DPMI

ACTION:   The configuration routine will add the appropriate handler to CONFIG.SYS

VDS

The Virtual DMA Services (VDS) Version 1.0 gives DMA support in protected mode environments.

SYNTAX:   VDS

ACTION:   The configuration routine will add the appropriate handler to CONFIG.SYS

Mouse

Mouse is either on or off.

SYNTAX:   MOUSE

ACTION:   The configuration routine will add the appropriate mouse driver to the AUTOEXEC.BAT. For instance, in the normal case, MOUSE.COM would be used.

VESA support

VESA support is either on or off.

SYNTAX:   VESA

ACTION:   If VESA support is not included in the ROM video BIOS, it may be necessary for the configuration routine to add a VESA TSR to the AUTOEXEC.BAT.

Files

SYNTAX: FILES = n

ACTION: Set FILES = n in CONFIG.SYS.

Buffers

SYNTAX: BUFFERS = N

ACTION: Set BUFFERS = n in CONFIG.SYS.

Audio - MIDI

SYNTAX: AUDIO_MIDI

ACTION: It may be necessary to add a sound driver for MIDI.

Audio - DAC

SYNTAX: AUDIO_DAC

ACTION: It may be necessary to add a sound driver.

Audio - FM Synthesis

SYNTAX: AUDIO_FM

ACTION: It may be necessary to add a sound driver.

Audio - Business

SYNTAX: AUDIO_BUSINESS

ACTION: It may be necessary to add a sound driver.

No Virtual 8086 Mode

> SYNTAX: No_V8086
>
> ACTION: A memory manager will not be loaded to load programs into UMBs.

CD Drive

> SYNTAX: CD_DRIVE
>
> ACTION: Load the corresponding CONFIG.SYS drivers and MSCDEX.EXE in AUTOEXEC.BAT.

Floppy Drive

> SYNTAX: Floppy
>
> ACTION: Load drivers that may be necessary to access floppy drive. (e.g. Load PCMCIA drivers for MCMCIA floppy.)

Fixed Disk

> SYNTAX: FIXED_DISK
>
> ACTION: Load drivers that may be necessary to access fixed disk. (e.g. Load SCSI drivers.)

Modem

> SYNTAX: MODEM
>
> ACTION: Load drivers that may be necessary to activate the MODEM.

EXECUTABLE

SYNTAX:    EXECUTABLE = <CD DRIVE>\XYZ.EXE

ACTION:    Specifies the program that starts the application. This can be a PIF, BAT, COM or EXE file. <CD DRIVE> is an optional parameter asking for the drive letter for the CD ROM drive.

DOSAPP

SYNTAX:    DOSAPP

ACTION:    Tells the enhanced launcher program not to load Windows to run this application.

WINDOWED

SYNTAX:    WINDOWED = <YES<NO<FULLSCREEN>

ACTION:    YES:  Indicates that the application will run under a tiled window.
                          NO:  Indicates that the application will not run under Windows.
                          FULLSCREEN:  Indicates that the application will run in a full screen window.

CONFIG.SYS

These lines will change CONFIG.SYS directly without further translation.

SYNTAX:  CONFIG.SYS = xxxxxxxxxx - Add a line to config.sys
                     CONFIG.SYS ^ xxxxxxxxxx - Append line in config.sys
                     CONFIG.SYS = xxxxxxxxxx - Replace line in config.sys

AUTOEXEC.BAT

These lines will be added directly to AUTOEXEC.BAT without further translation.

```
SYNTAX:  AUTOEXEC.BAT = xxxxxxx - Add a line to autoexec.bat
         AUTOEXEC.BAT ^ xxxxxxx - Append line in autoexec.bat
         AUTOEXEC.BAT = xxxxxxx - Replace line in autoexec.bat
```

SYSTEM.INI

These lines will be added to SYSTEM.INI or will replace lines in SYSTEM.INI without further translation.

```
SYNTAX:  SYSTEM.INI [section] = xxxxxxx - Add a line to system.ini
         SYSTEM.INI [section] ^ xxxxxxx - Append line in system.ini
         SYSTEM.INI [section] = xxxxxxx - Replace line in system.ini
```

APPENDIX B

Scripting language description

A statement is equivalent to one line of text, everything from the beginning of the line to the next newline character.

Conditional Statement

A conditional statement has the following syntax: if <condition> then <statement> else <statement>. The else clause is optional. If the condition evaluates to true, then the then clause will be interpreted. Otherwise, the else clause will be interpreted.

Group Statement

Any number of statements may be grouped together by using the begin <statement list> end construct, and is syntactically identical to a single statement. Each statement will be interpreted sequentially.

Change Directory and DOS Command Statements

A change directory statement is cd <path>. This is the same as the standard DOS change directory with one exception: if a drive letter is specified in the path, the current drive will be changed to the specified drive as well.

Any other statement will be passed to the operating system for interpretation. Note that this is extremely system dependent. A statement which might be correct under DOS would be interpreted as a filename followed by some parameters under Windows.

Drive Letter Variable

A path is a standard DOS path consisting of an optional drive letter (followed by a colon), an optional directory path (followed by a backslash), and a target file or directory name. In addition, three "special" drive letters cd:, win:, and boot: will be understood to stand for the drive letter of the CD drive, the windows drive, and the boot drive respectively.

Exists Operator

A condition which allows for the testing of the existence of a file or directory has the form <path> exists. If the file or directory exists, the condition returns true, otherwise it returns false.

Found Operator

A condition which allows for finding of an instance of a file or directory has the form <path> found. The path is taken as the starting point for the search. The specified directory as well as all of its subdirectories will be searched for any instance of the specified file or directory. If the file or directory is found, the condition returns true, otherwise it returns false.

DOS Expression

The expression DOS evaluates to the version of DOS which is being used. If there is no DOS, the value returned will be "0" (zero).

Windows Expression

The expression windows evaluates to the version of Windows which is being used. If there is no Windows or if Windows is no currently running, the value returned will be "0" (zero).

Version Expression

The expression <path> version allows for testing the version of a file. If the file exists and has an associated version, that value is returned. In any other case, the value "0" (zero) is returned.

Logical Operators

All operators have equal precedence, and are evaluated left to right. The order of evaluation may be changed by grouping expressions within parenthesis. The list of operators is:

1) not <condition> returns the opposite of the given condition. If condition is true, it returns false. if condition is false, true is returned.

2) <condition> and <condition> evaluates to true if and only if both conditions are true. if the first condition evaluates to false, the second condition is not evaluated.

3) <condition> or <condition> evaluates to true if either condition is true. If the first condition evaluates to true, the second condition is not evaluated.

4) <value> <comparator> <value> compares the two values using the comparators <, <=, > >=, =, and <>. The correspond to less than, less than or equal, greater than, greater than or equal, equal, and not equal (!= may also be used.)

5) its returns the path of the previous file or directory which was found using either the exists or found expression.

APPENDIX C

The Translation File

Resource Cataloging Language

The translation file is initial provided by the system manufacturer since most systems today ship, in most cases, with DOS and Windows installed. It provides the translation of system resources requested to the drivers that provide the resources.

Preceding each driver name is an indicator for the placement of the driver. An '{A}' indicates that the rest of the line should be comprehended in the AUTOEXEC.BAT file. A '{C}' indicates that the rest of the line should be comprehended in the CONFIG.SYS file. An '{S}' indicates that the rest of the line should be comprehended in the SYSTEM.INI file. A '{W}' indicates that the rest of the line should be comprehended in the WIN.INI file.

After the '{A' or '{C', the size of the loaded driver is necessary if the driver can be loaded into High Memory Areas. For example, '{A,41120}C:\MOUSE\MOUSE.COM' would indicate that the mouse driver would take about 41K of memory space when loaded.

High memory

```
EXAMPLE:   [HIMEM]
           {C}C:\DOS\HIMEM.SYS
           {C}DOS=HIGH
```

Expanded memory

```
EXAMPLE:   [EMS]
           {C}C:\DOS\EMM386.EXE
```

Extended memory

EXAMPLE:   [XMS]
                         {C}C:\DOS\HIMEM.SYS

VCPI

EXAMPLE:   [VCPI]
                         {C}C:\386MAX\386MAX.SYS

DPMI

EXAMPLE:   [DPMI]
                         {C}C:\386MAX\386MAX.SYS
                         {C}DOS=HIGH

VDS

EXAMPLE:   [VDS]
                         {C}C:\386MAX\386MAX.SYS

Mouse

EXAMPLE:   [MOUSE]
                         {A}C:\MOUSE\MOUSE.COM

Disk cache

EXAMPLE:   [DISKCACHE]
                         {A}C:\WINDOWS\SMARTDRV.EXE

VESA support

EXAMPLE:   [VESA]
                         {A}C:\CPQDOS\CPQVESA.EXE

Audio - MIDI

EXAMPLE: [AUDIO MIDI]

Audio - DAC

EXAMPLE: [AUDIO DAC]

Audio - FM Synthesis

EXAMPLE: [AUDIO FM]
                  {A}SET BLASTER=A220 I5 D1 T5

Audio = Business

EXAMPLE: [AUDIO BUSINESS]

No Virtual 8086 Mode
This is a directive to the system software that translates the initialization file.

EXAMPLE: [NO VIRTUAL MODE]

CD Drive

EXAMPLE: [CD_DRIVE]
                  {C}DEVICE+ASPI2DOS.SYS
                  {C}DEVICE=ASPICD.SYS
                  {A}C:\SCSI\MSCDEX.EXE

Floppy Drive

EXAMPLE: [FLOPPY]
                  {C}DEVICE=PCMCIA.SYS

Fixed Disk

EXAMPLE: [FIXED_DISK]
        {C}DEVICE=ADAPSCSI.SYS

MODEM

EXAMPLE: [MODEM]

[META-PARSER]

DESCRIPTION: This is a required element. This program is tied to the specific memory manager used. The enhanced launcher program will spawn this program with the handles of the new AUTOEXEC.BAT, CONFIG.SYS, the translation file and the initialization file. This program is responsible for optimizing memory usage according to the initialization file directives.

EXAMPLE: [META-PARSER] = PARS386M.EXE

We claim:

1. A computer system that automatically launches a computer application comprising a storage medium that stores initialization information associated with the application, a processor instructed to read the initialization information and use it in connection with launching information stored in the computer system to automatically launch the application without user intervention, and an input/output device coupled to the processor.

2. The computer system of claim 1, wherein the launching information and the initialization information together are sufficient to enable the computer system to launch the application.

3. The computer system of claim 1, wherein the initialization information is expressed in accordance with a predefined syntax.

4. The computer system of claim 1, wherein the storage medium comprises a first storage medium that stores the initialization information, the computer system further comprising a second storage medium that stores the launching information.

5. The computer system of claim 1, wherein the initialization information comprises an initialization file.

6. The computer system of claim 1, wherein the storage medium comprises a CD-ROM.

7. The computer system of claim 1, further compising a hard drive which stores the launching information.

8. The computer system of claim 1, further comprising RAM which stores the launching information.

9. A computer system comprising a storage medium on which is stored an application program, and an initialization file which identifies categories of computer system resources used by the application, including sound resources and video resources, includes execution information identifying an executable file that starts the application and information about installation and setup requirements of the application, a processor which uses the initialization information to automatically launch the application program, and an input/output device coupled to the processor.

10. A computer system that launches an application program comprising a storage medium that stores an initialization file associated with the application program along with the application program, a processor that is instructed to make passes through the initialization file to determine the total memory requirements of the application program, initialize configuration files and autoexecution files in the system, interpret information in the initialization file describing system resources required for the execution of the application program and for installation or setup of the application program, alter the configuration files and the autoexecution files in accordance with the passes through the initialization file and the interpretation of information in the initialization file, and launch the application program in the system with no participation by the user, and an input/output device coupled to the processor.

11. A computer system, comprising a resource to be used with an application to be run on the computer system, and a storage medium that stores information that is expressed in accordance with a predefined syntax, that defines how the resource is to be configured, and that associates configuration information with a category identifier to which the resource belongs, the identifier corresponding to identifier information associated with the application.

12. The computer system of claim 11, wherein the resource comprises a modem.

13. A computer system, comprising a resource to be used with an application to be run on the computer system, and a storage medium that stores information that is expressed in accordance with a predefined syntax, that defines how the resource is to be configured, and that associates configuration information with a resource identifier to which the resource belongs, the identifier corresponding to identifier information associated with the application.

14. The computer system of claim 13, wherein the resource comprises a modem.

15. A computer system that aids automatic launching of a computer application comprising a storage medium that stores information for enabling automatic determination of whether an installation or setup program must be run with respect to the application, and information about how to run it, a processor that is instructed, in connection with launching the application, to automatically determine if an installation or set up program must be run for the application, and if so, running it, and an input/output device coupled to the processor.

* * * * *